(12) United States Patent
Naylor, Jr. et al.

(10) Patent No.: US 6,384,836 B1
(45) Date of Patent: *May 7, 2002

(54) COLOR GAMUT CLIPPING

(75) Inventors: William Clark Naylor, Jr., Mount Kuring-gai; Kia Silverbrook, Leichhardt, both of (AU)

(73) Assignee: Canon Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,510

(22) Filed: Aug. 27, 1997

Related U.S. Application Data

(63) Continuation of application No. 08/576,044, filed on Dec. 21, 1995, now abandoned, which is a continuation of application No. 08/177,305, filed on Jan. 4, 1994, now abandoned.

(30) Foreign Application Priority Data

Jan. 11, 1993 (AU) .............................................. PL6764

(51) Int. Cl.$^7$ ................................................. G09G 5/02
(52) U.S. Cl. ...................................... 345/589; 345/593
(58) Field of Search ................................ 345/150, 153, 345/154, 155, 147, 589, 593, 591, 596, 599, 603, 604, 690, 590, 616; 358/518–521

(56) References Cited

U.S. PATENT DOCUMENTS

| | | | | |
|---|---|---|---|---|
| 4,733,230 A | * | 3/1988 | Kurihara et al. ............. | 345/147 |
| 4,751,502 A | * | 6/1988 | Ishii et al. ................... | 345/157 |
| 4,843,379 A | | 6/1989 | Stansfield .................... | 340/701 |
| 4,941,038 A | | 7/1990 | Walowit ....................... | 358/80 |
| 5,057,914 A | * | 10/1991 | Tsuji et al. .................. | 358/521 |
| 5,210,602 A | * | 5/1993 | Mintjer ........................ | 358/518 |
| 5,319,473 A | * | 6/1994 | Harrington ................... | 358/518 |

FOREIGN PATENT DOCUMENTS

| | | |
|---|---|---|
| EP | 0330361 | 8/1989 |
| EP | 0342835 | 11/1989 |
| EP | 0421772 | 4/1991 |
| EP | 0501023 | 9/1992 |

OTHER PUBLICATIONS

Foley et al "Fundamentals of Interactive Computer Graphics" Jul. 1984, pp. 606–621.*

Maureen C. Stone, et al., "Color Gamut Mapping and the Printing of Digital Color Images", ACM Transactions on Graphics, vol. 7, No. 4, pp. 249–292 (Oct. 1988).

* cited by examiner

*Primary Examiner*—Regina Liang
(74) *Attorney, Agent, or Firm*—Fitzpatrick, Cella, Harper & Scinto

(57) ABSTRACT

A process of displaying images on output displays, incompatible with the input format, is disclosed. In particular, a process of displaying RGB input on a screen having Red, Green, Blue and White bi-level pixel elements defines a convex hull of the output points and maps the input data into the convex hull. Those values are moved outside the convex hull so that they lie on the surface of the convex hull and the mapped values are halftoned to produce output pixel elements corresponding to an approximation of the input pixels.

37 Claims, 20 Drawing Sheets

COLOR GAMUT CLIPPING

This application is a continuation of application Ser. No. 08/576,044, filed Dec. 21, 1995 now abandoned, which is a continuation of application Ser. No. 08/177,305, filed Jan. 4, 1994, now both abandoned.

FIELD OF INVENTION

The present invention relates to colour display apparatus such as television displays, colour computer displays and colour printers, and, in particular, the display of colour images on a raster colour display apparatus.

DESCRIPTION OF THE RELATED ART

Colours are often displayed on a computer display according to a particular model. The red, green, blue (RGB) colour model is one that is in common use with Cathode Ray Tubes (CRT) and colour raster display devices. Other colour display models include cyan, magenta, yellow (CMY) often used in colour-printing devices. An example of the use of the RGB model is in the NTSC picture display standard which is commonly used with computer displays. In this standard, each pixel element of the screen is divided into three separate sub groupings. These separate subgroupings or pixel elements are used to show the portions of Red, Green and Blue of a given pixel colour respectively.

The prior art shall now be described with reference to the following drawings in which:

FIG. 1 is a schematic view of a pixel of a CRT type device;

FIG. 2 is a schematic view of a pixel having Red, Green, Blue and White pixel elements; and FIG. 3 is a schematic view of the colour gamut of the CRT type device as shown in FIG. 1.

As shown in FIG. 1, the viewing surface of a colour CRT consists of a large number of closely spaced pixels 1. Each pixel 1 is made up of a red (R), green(G) and blue (B) phosphor dot or pixel element. These dots are generally sized such that light emanating from the individual dots is perceived by the viewer as a mixture of the corresponding three colours. A wide range of different colours can thus be produced from a pixel by pixel variation of the strength with which each phosphor dot is excited. A conversion arrangement (not shown) is normally provided so that the excitation of each phosphor dot has some proportionality to the value of each of the above mentioned pixel element subgrouping. By way of example, a 24 bit per pixel colour display system divided into 8 bits for each of the three colours red, green and blue is often used. This corresponds to $2^8$ or 256 separate intensity levels of each of red, green and blue respectively giving a total of $2^{24}$ different colour values. A colour display capable of displaying this many colours can approximate a continuous tone image to such a degree that for all practical purposes the display can be considered to be a continuous tone display.

In order to conceptualize the range of colours that can be displayed by this method it is helpful to map these colours into a unit cube 3 as shown in FIG. 3. The individual contributions of each of the three separate subgroups at any one particular point are added together to yield the final colour. The directions of increased intensity of a given primary colour is shown by the axis 4 with green increasing to the right, blue increasing vertically, and red increasing into the plane of the page. The chroma or saturation of a particular colour is represented by the shortest distance of a colour from the main diagonal of the cube. The main diagonal of the cube, running from (0,0,0) to (1,1,1), with equal amounts of each primary, represents the different grey levels or grey scale, from black (0,0,0) to white (1,1,1).

The actual colours that can be displayed by a device will then form points within and on the surface of the cube's volume. For example, in the 24 bit per pixel display model, the 256 different intensity levels of displaying the colour blue will form 256 separate horizontal planes through the cube. Similarly for the red and green intensity levels. The intersection of these planes will form $2^{24}$ separate points within, and on the surface of, the cube.

Many display devices are unable to actually display the full range of colours provided by, for example, a 24 bit input pixel. For example, a black and white raster image display can only display two colours, black and white. Other colour display devices can only display a finite number of discrete intensity levels for each pixel element.

Recently, methods have been developed to increase the number of colours displayable on an discrete colour display device. The methods used are known generally as halftoning. For an explanation of the different aspects of halftoning the reader is referred to the book 'Digital Halftoning' by Robert Ulichney, published in 1991 by MIT Press.

For an example of a colour halftoning method, reference is made to an error diffusion method disclosed in 'Color Image Quantization for Frame Buffer Display' by Paul Heckbert, published in Computer Graphics, Volume 16, Number 3, July 1982, pages 297–304, herein after referred to as the Heckbert process.

In the Heckbert process, the different possible output values of the display are chosen as the representative colours of the colour gamut of displayable images. A vector measure in a 3-dimensional colour space representing the distance between the nearest displayable colour value and a current input colour value is computed and this value is then preferably added to neighbouring pixels using a Floyd and Steinberg process (known per se).

However, not all display devices display the same range of colours, hence consideration must be given to what colour should actually be displayed when an input pixel's colour lies outside the range or gamut of the displayable colours of a particular device.

The use of the above mentioned RGB colour model is helpful when each pixel of the display device comprises red, green and blue elements. However, it can sometimes be the case that the display device being used is not a RGB type device. For example, FIG. 2 shows a representation of a display device where each pixel is made up of a Red, Green, Blue and White (RGBW) element.

SUMMARY OF THE INVENTION

It is an object of the present invention to provide a means that permits the presentation of information according to one data format and gamut on a display that displays data according to a different data format and gamut.

In accordance with one aspect of the present invention there is disclosed a method for displaying a colour image on a display device, said colour image being provided as input colours in an input colour format, said method comprising the steps of:

mapping those output colours able to be displayed by the display device into a 3-dimensional vector space;

forming a volume enclosing all the output colours of the display device;

mapping each input colour into the 3-dimensional vector space;

moving any of the input colours outside the volume to corresponding points inside or on a surface of the volume; and halftoning the input colours to produce an image that can be displayed on the display device.

In accordance with another aspect of the invention there is provided an apparatus for displaying a colour image on a display device, said colour image being provided as input colours in an input colour format, said display device capable of displaying a subset of said input colours, said apparatus comprising a plurality of channel processing means, said channel processing means comprising:

undisplayable colour determination means adapted to determine those undisplayable colours outside the displayable gamut of the display device and remapping means connected to said undisplayable colour determination means and adapted to alter said undisplayable colours to be displayable colours.

BRIEF DESCRIPTION OF THE DRAWINGS

A preferred embodiment of the present invention will now be described with reference to the accompanying drawings in which.

DESCRIPTION OF THE PREFERRED EMBODIMENT

The preferred embodiment relates to a means for displaying an image encoded according to an RBG format on a Red, Green, Blue and White (RGBW) Display. As the dominant form of display available is a RGB type display, it is desirable to be able to display an image intended for a a RGB display on a RGBW type display. Preferably the RGBW display device has a bi-level white element.

Figure 1:
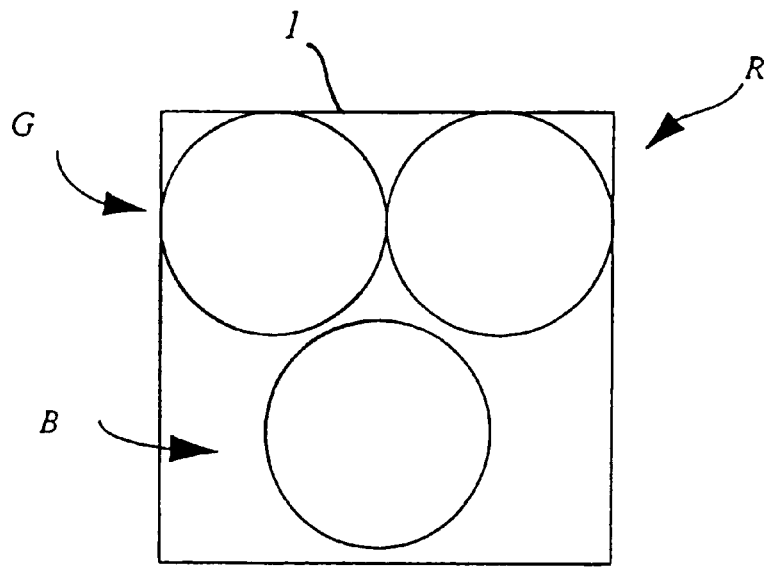
Figure 2:
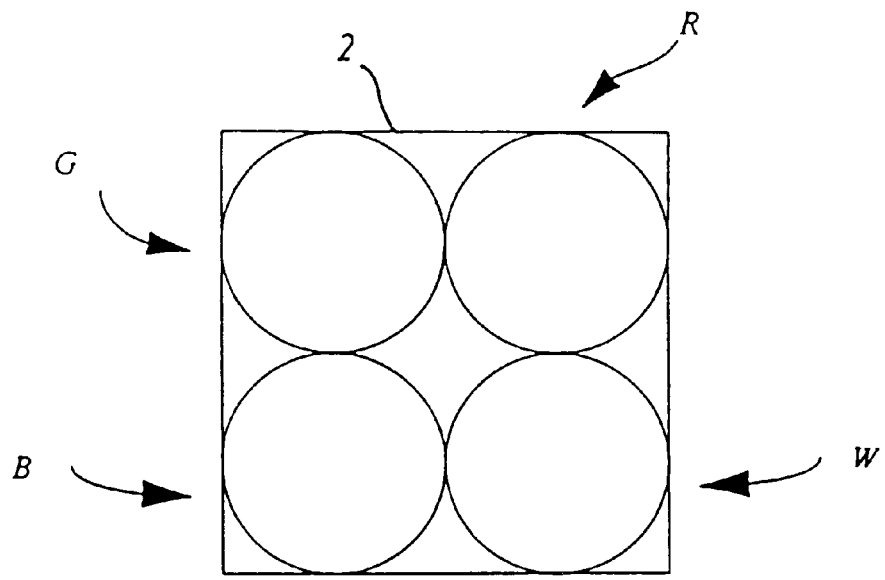

One option for displaying an RGB image on such a RGBW display is to use only the Red, Green and Blue elements. This corresponds to the white pixel element, as shown in FIG. 2, being unused. A white pixel element is made up of equal amounts of red, green and blue primary colours. The discarding of the white pixel element corresponds to, or results in, a loss of luminosity in the possible range of displayable output colours. Another option is to have the white element of the display constantly illuminated. This corresponds to or results in, an increase in luminosity of all the colour elements that can be displayed, but gives a loss of saturation relative to the colours which could have been displayed if the white element had not been used.

Both these methods fail to use the full potential of the display device to display colours of a wide range of intensities.

Figure 4:
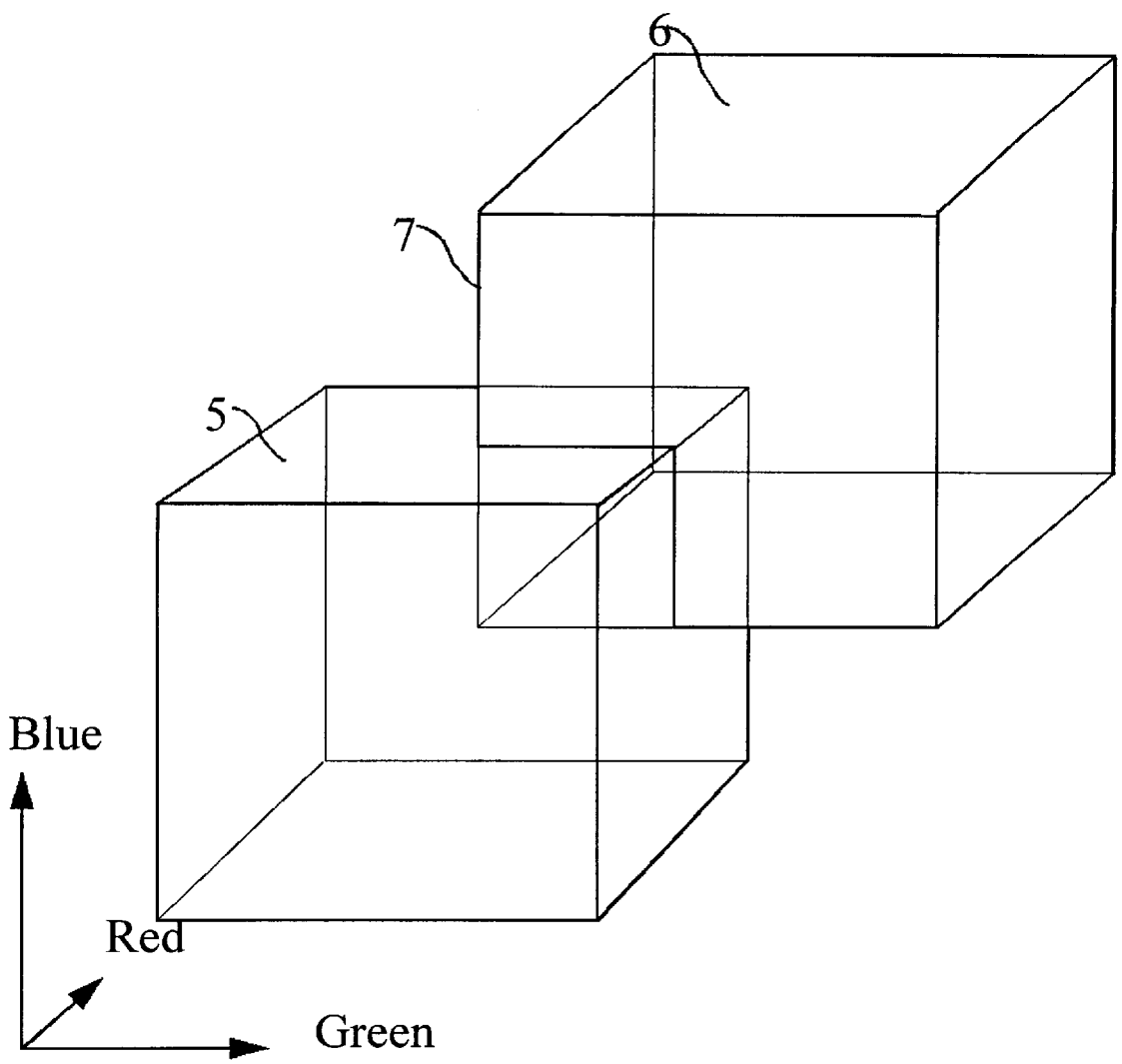
FIG. 4 illustrates the colour gamut of a display device having red, green, blue and white pixel elements.

Normally the colour white or grey is formed by equal intensities of red, green and blue pixel elements with different grey levels corresponding to different intensities. Hence the use of an extra white pixel corresponds to a translation of the relevant colour cube along the grey axis of the RGB space. FIG. 4 shows the overlapping RGB colour cubes for a display device having a bi-level white pixel element. The lower cube 5, represents the colour space mapped out by the red, green and blue pixel elements of the colour display device when the white pixel element is not illuminated. The upper cube 6 represents the colour space when the white pixel is illuminated. The upper cube has been translated along the diagonal greyscale axis by a distance which is proportional to the intensity of the white element. Hence the actual degree of overlap of the two different cubes is dependant upon this translation factor and in turn on the intensity of the white pixel. A volume 7 (as represented by the darker lines of FIG. 4) swept out by the combination, or summation, of the cubes 5 and 6 therefore represents the totality of different colours that can, by means of halftoning methods, be displayed by the display device.

Figure 3:
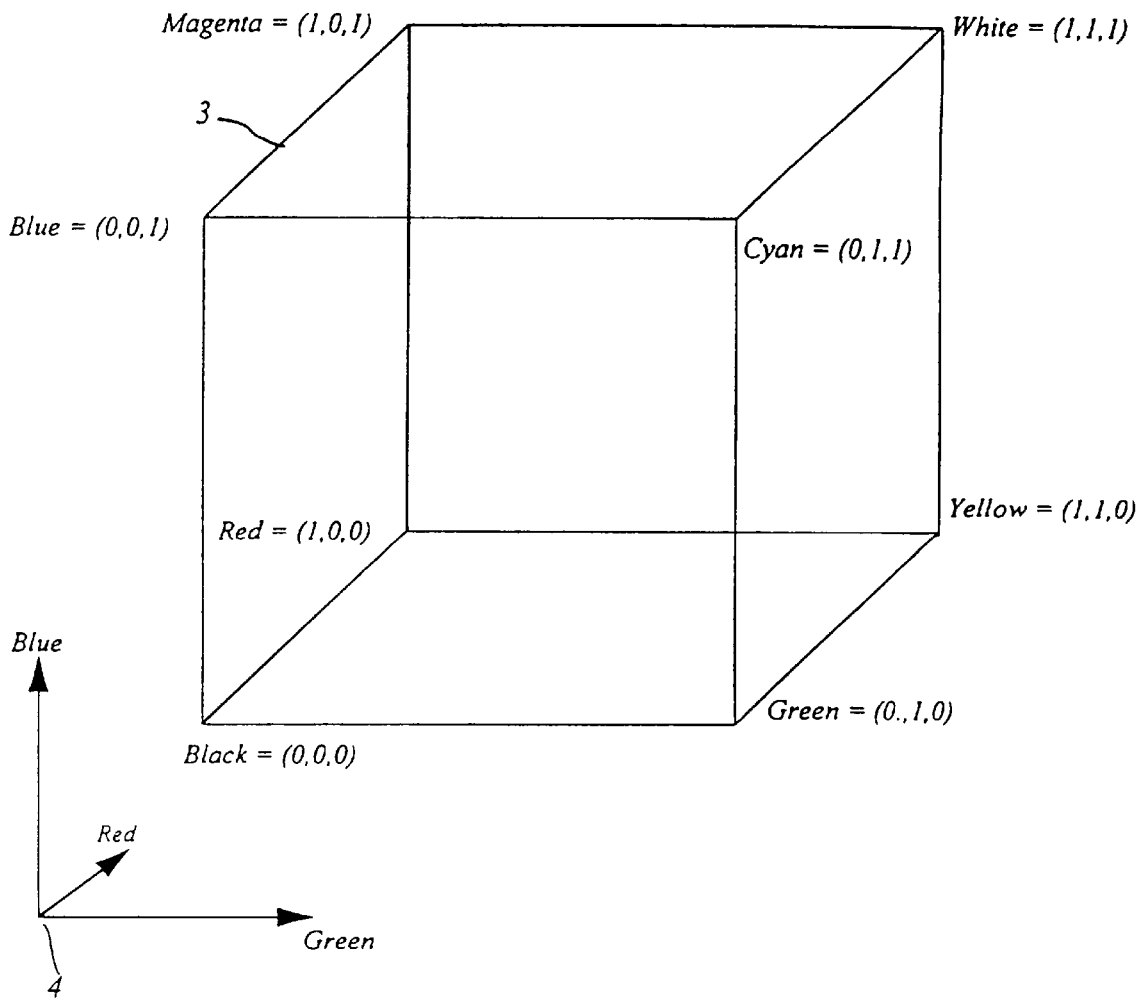
Figure 5:
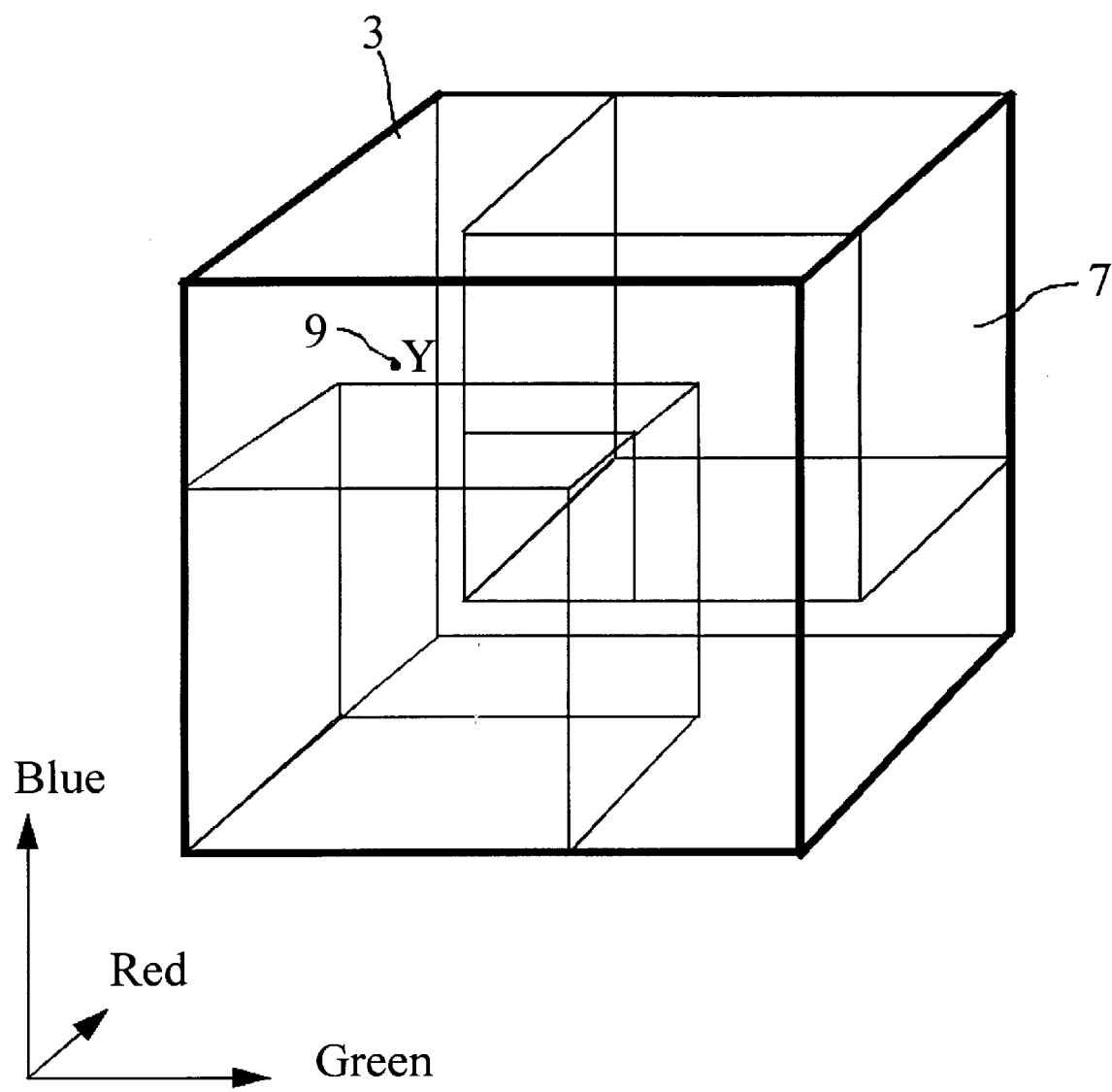
FIG. 5 illustrates the mapping of the colour gamut of the display device as illustrated in FIG. 4 into the colour gamut of the normal display device of FIG. 3.

As will be appreciated from FIG. 4, the overall colour space is no longer in the form of a cube. The colours of the input pixels are able to span the range of values as depicted by the original colour cube in FIG. 3. Greater advantage can be taken of the granularity of all the colours that can be displayed by the display device if the relationships between the colour spaces depicted in FIG. 3 and FIG. 4 are transformed as depicted in FIG. 5 which shows the RGBW colour space 7 of FIG. 4 which fits inside that of the RGB cube 3 of FIG. 3.

Although, by using the full colour space of the RGBW device as shown in FIG. 4, it has been possible to increase the range of intensities of colours that can now be displayed, a further problem has been created. The problem is the inability to display those colours that lie inside the RGB colour space 3 as shown in FIG. 5, but outside the RGBW space 7. A first example of such a colour 9 is depicted by the letter Y in FIG. 5.

Figure 6:
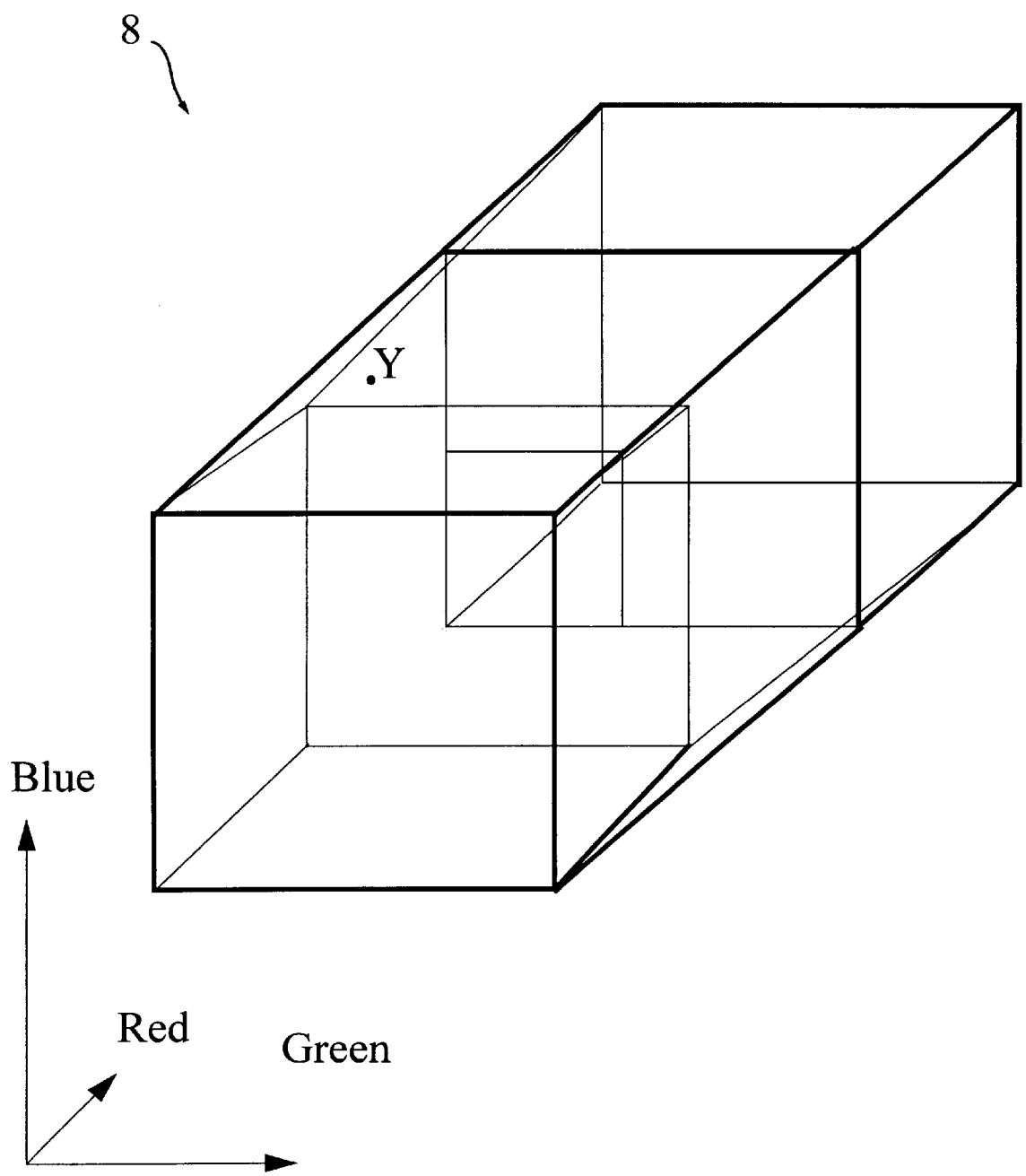
FIG. 6 illustrates the convex hull volume of the display device of FIG. 4.

Referring now to FIG. 6, in a first example, the colour Y lies within the volume swept out by a convex hull volume encompassing all the points displayable by the RGBW display. A convex hull is the equivalent volume that would be formed by stretching a rubber sheet around all the points. Hence, any line between two points inside a convex hull is also inside the same convex hull. More formally, if we choose one of the points to be the origin and denote the set of vectors $r_1, r_2, \ldots r_n$ to be the vectors from the origin to the other points, then the convex hull is a set of points (represented by the vector $r_h$) formed by using weights $w_i >= 0$ that satisfy the following conditions:

$$r_h = \sum_{i=1}^{n} w_i \cdot r_i$$

and $$\sum_{i=1}^{n} w_i = 1.$$

An example of the convex hull swept out by the RGBW display gamut is shown in FIG. 6. Although it is not possible to directly display the colour represented by the position Y, the principles of halftoning, such as the Heckbert process, referred to previously, can be used to display a close approximation of that colour.

Hence, by means of halftoning, it is possible to simulate the display of all those values swept out by the convex hull of the RGBW colour values as shown in FIG. 6.

Figure 7:
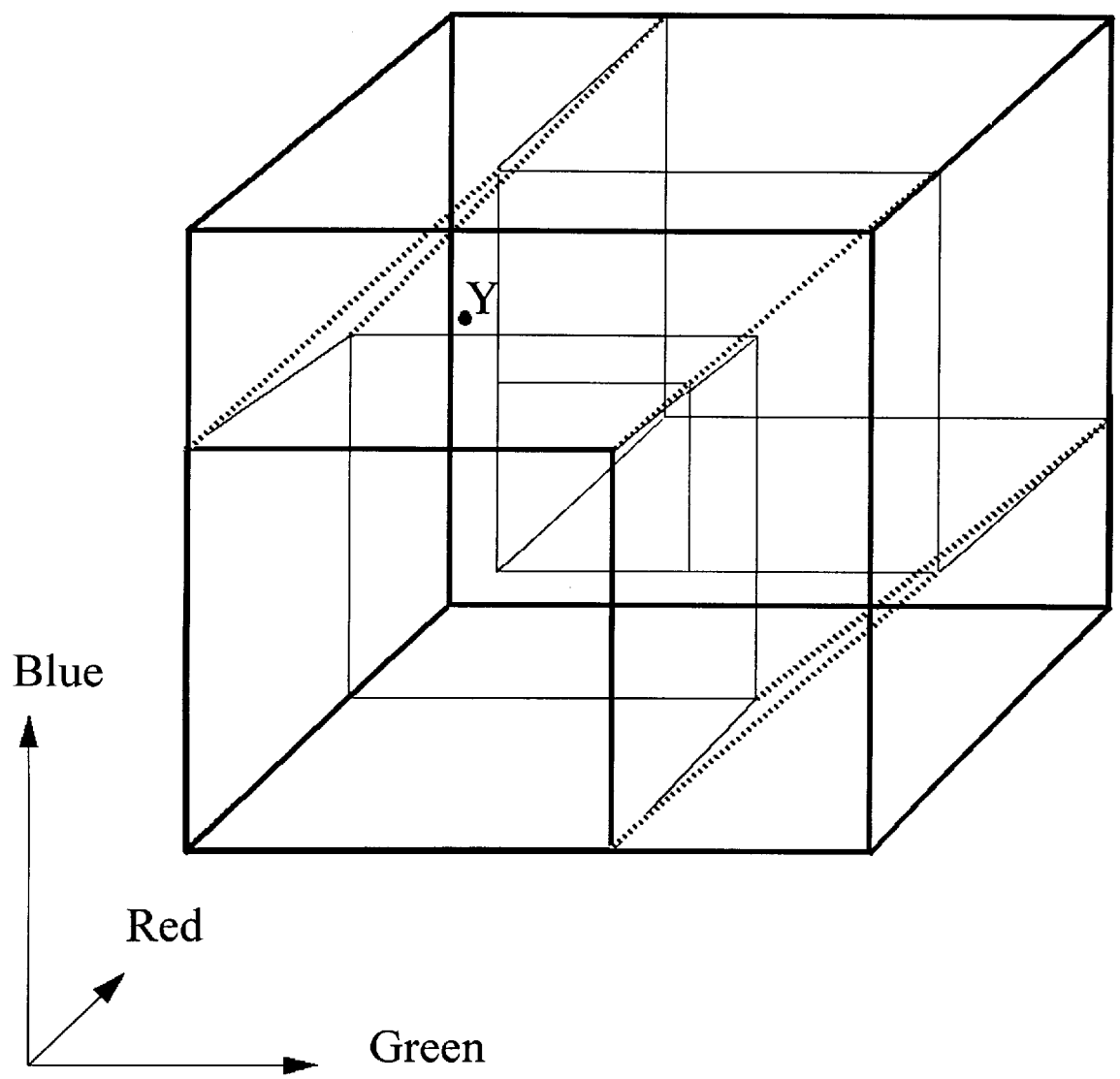
FIG. 7 illustrates the volume of FIG. 6 inside the colour gamut of FIG. 3.

FIG. 7 depicts the resulting colour space in addition to the desired colour space.

Figure 8:
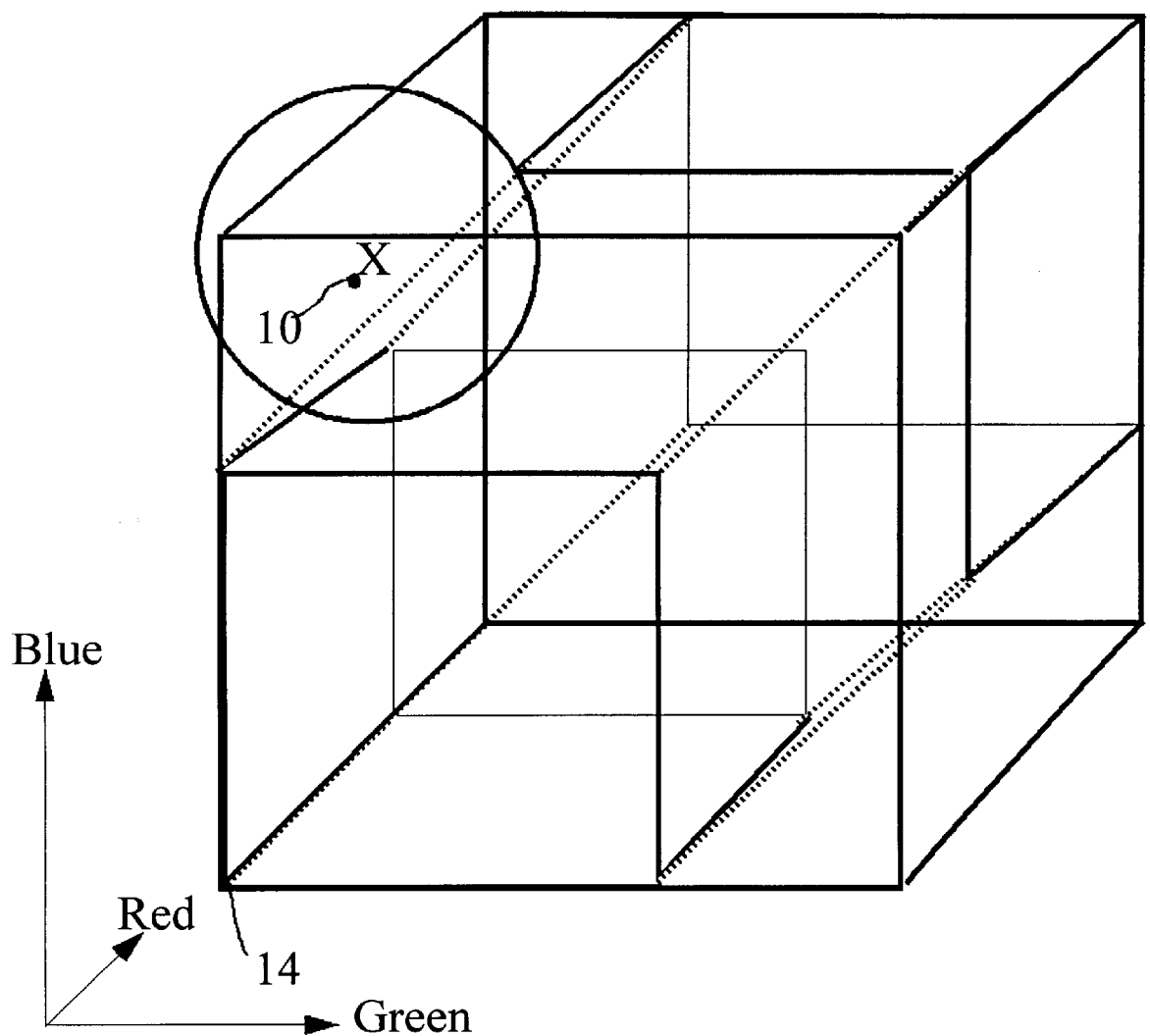
FIG. 8 illustrates displaying colour values that do not form part of the output colour gamut.

Referring now to FIG. 8, there is shown a second example of a colour 10 represented by the letter X. Here, the corresponding colour value represented by X is outside the representable space and must be changed to display a representable colour. A number of different methods can be used to minimize the loss of reproduction quality in the displayed image.

Figure 9:
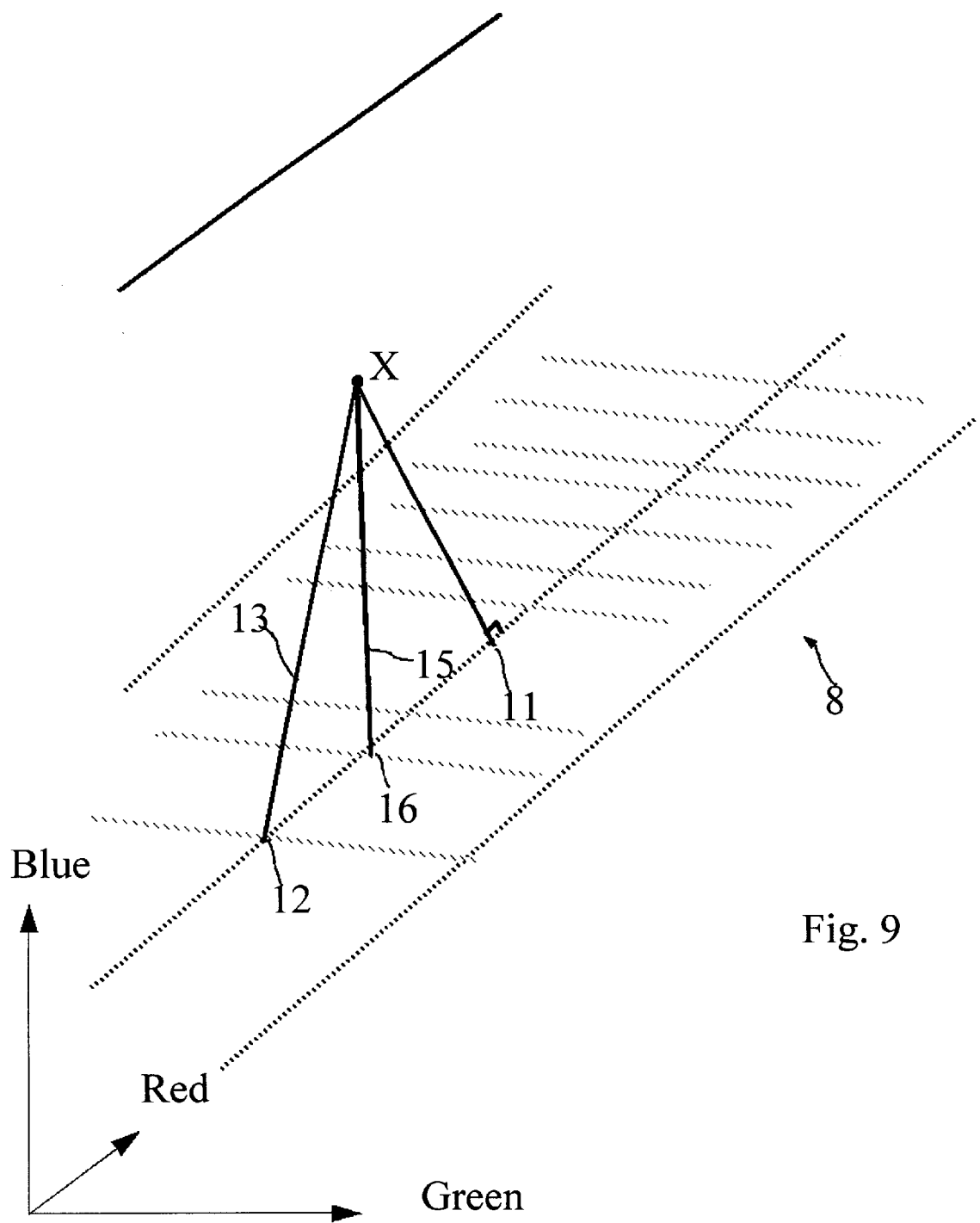
FIG. 9 is an enlarged portion of FIG. 8, illustrating different methods of displaying colours outside the output colour gamut.

Turning now to FIG. 9, there is shown an enlarged view of the circled region shown in FIG. 8, with X being the value to be displayed.

In a first method, a decision is made to firstly move the colour value X to the closest point 11 of the convex hull volume 8 of the display, and to thereby display the value of the print 11 by means of halftoning methods instead. In practice, owing to the nature of the volume swept out by the RGBW colour space, this will be near equivalent to a reduction in the saturation or chromaticity of the colour in question as a result of the new colour value 11 lying closer to the overall cube diagonal, which is assumed to represent the grey scale of the cube.

The resulting colour which is halftoned is closest, in RGB space, with euclidean distance measurement, to that which representation is desired, thereby introducing the minimum RGB mean-squared error in the displayed pixel.

In a second method, an intersection point 12 of the surface of the volume 8 and a line 13 drawn from the point X to the origin of the colour space 14 (as seen in FIG. 8) is calculated. It is assumed that the origin of the colour space is in the vicinity of the point representing black in the original colour cube. The pixel position corresponding to the point 12 is then used as the value to be displayed via halftoning.

As the line 13 is in the form of a vector from the origin 14 to the point X, the effect of this method is to preserve the proportions of the three primary colours in the output value, at the expense of the luminosity of the displayed colour.

A third method, is to change only one of the three values representing the colour to be displayed, until an intersection with the volume is achieved. In this example, the blue component value of the colour X is reduced along a line 15 until it intersects at a point 16 on the convex hull volume 8. The blue channel is chosen because of the eyes relative insensitivity to blue in comparison with green and red. This method is called the 'drop-clip' method. Although this technique has the effect of changing the hue of a particular colour, the advantage of this process is that there is an alteration to only one of the primary colours. Accordingly, this method is significantly simpler to implement in a hardware type device.

Figure 10:
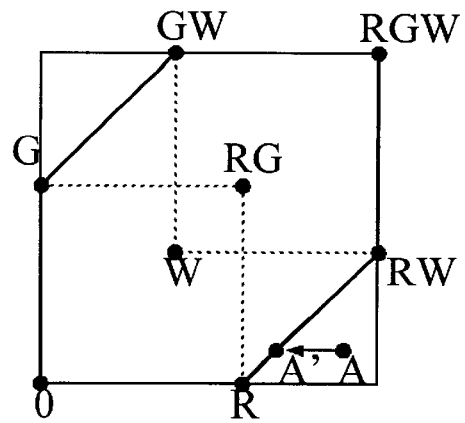
FIG. 10 illustrates another example of the drop clip method used in the preferred embodiment.

Referring now to FIG. 10 there is shown an example of the drop clip method where the gamut of the two dimensional cube has been projected to a two dimensional cube showing only the Red and Green dimensions only. In order to transform the point A to A' in accordance with the drop clip method, the following method should be used:

Assuming a RGB pixel data format with R, G and B in the range 0 to 255:

If R>minimum(G,B)+GLT, then set $R_{out}$=minimum(G, B)+GLT;

If G>minimum(R,B)+GLT, then set $G_{out}$=minimum(R, B)+GLT;

If B>minimum(R,G)+GLT, then set $B_{out}$=minimum(R, G)+GLT; where GLT is the Gamut Limit Threshold, representing the intensity value of an illuminated Red, Green or Blue portion of a particular pixel relative to the illumination of the same portion and a white portion of a pixel. For the purpose of the present example, it is assumed that GLT is constant for each of the Red, Green and Blue channels.

Figure 11:
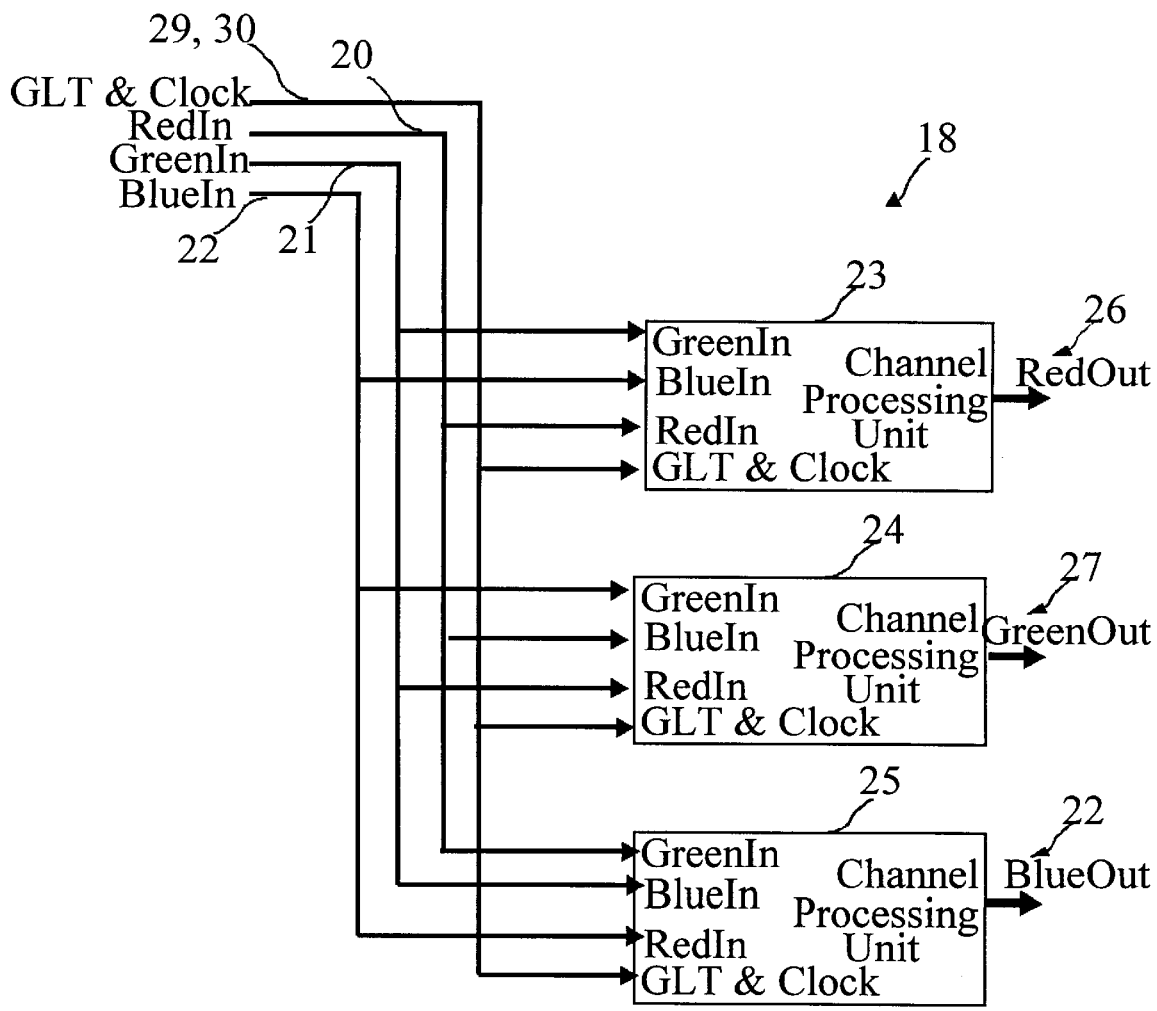
FIG. 11 is a schematic view of an apparatus implementing the drop clip method.

Referring now to FIG. 11, there is shown a gamut clipping apparatus 18 implementing the drop clip method of FIG. 10 for input comprising an 8-bit per pixel Red 20, Green 21 and Blue 22 colour pixel input. This input is processed by a corresponding channel processing unit 23, 24, 25 to produce a corresponding red output channel 26, green output channel 27 and a blue output channel 28. Additional clocking information 29 and the constant gamut limit threshold (GLT) 30 are also provided as inputs to the gamut clipping apparatus 18.

Figure 12:
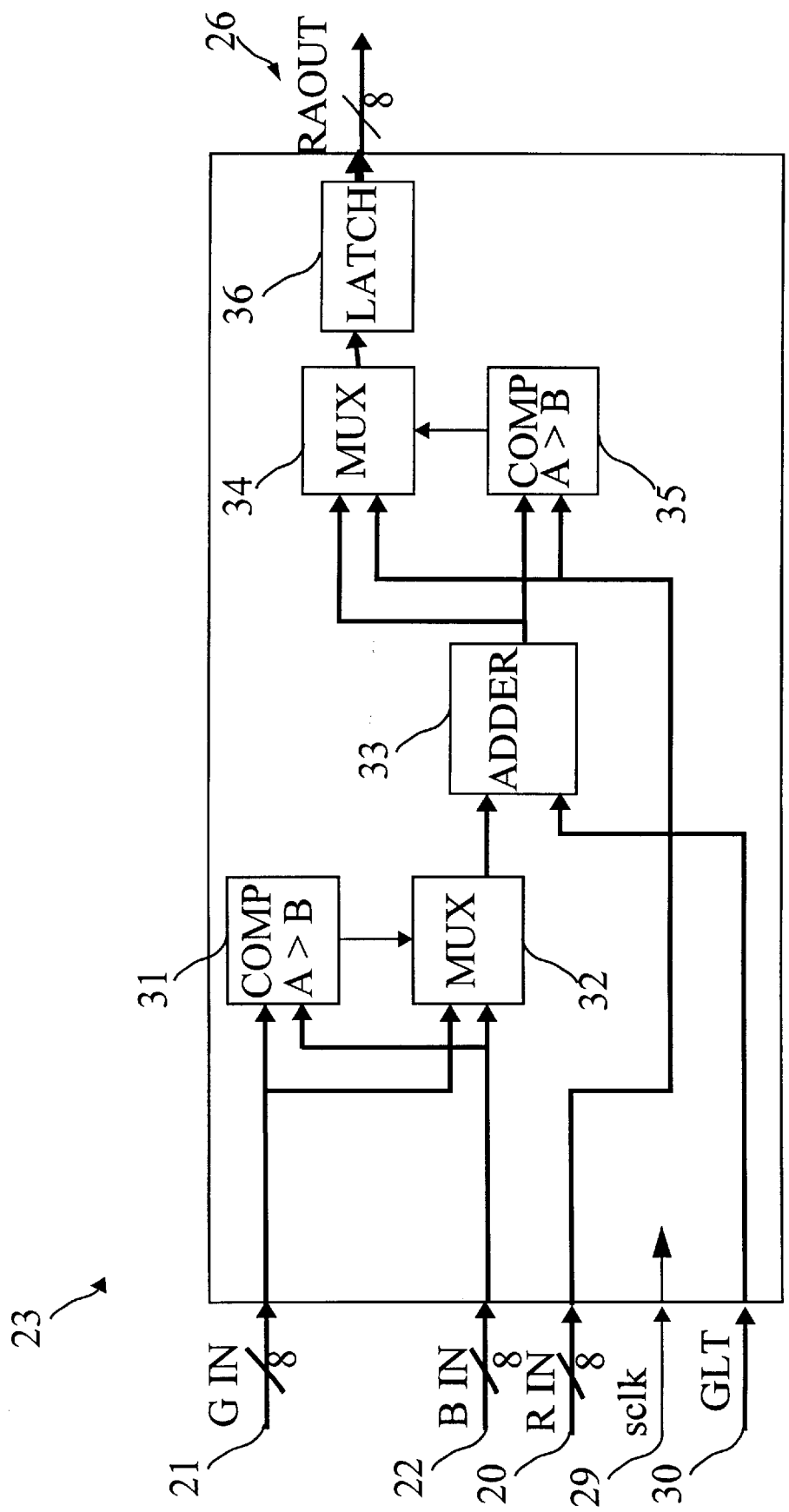
FIG. 12 is a more detailed schematic view of the first channel processing unit of FIG. 11.

Referring now to FIG. 12 there shown is a more detailed schematic view of the first channel processing unit of FIG. 11. Each channel processing unit is the same except the inputs are permuted. This channel processing unit 23 is designed to implement the first conditional statement of the above mentioned method.

An initial comparator 31 and multiplexer 32 are used to determine the minimum value of the Green input channel 21 and the Blue input channel 22. The resultant minimum is then added with the GLT 30 by adder 33. This new value is then used to determine if the output value should be altered by comparator 35 and multiplexer 34 as outlined by the above algorithm.

Figure 13:
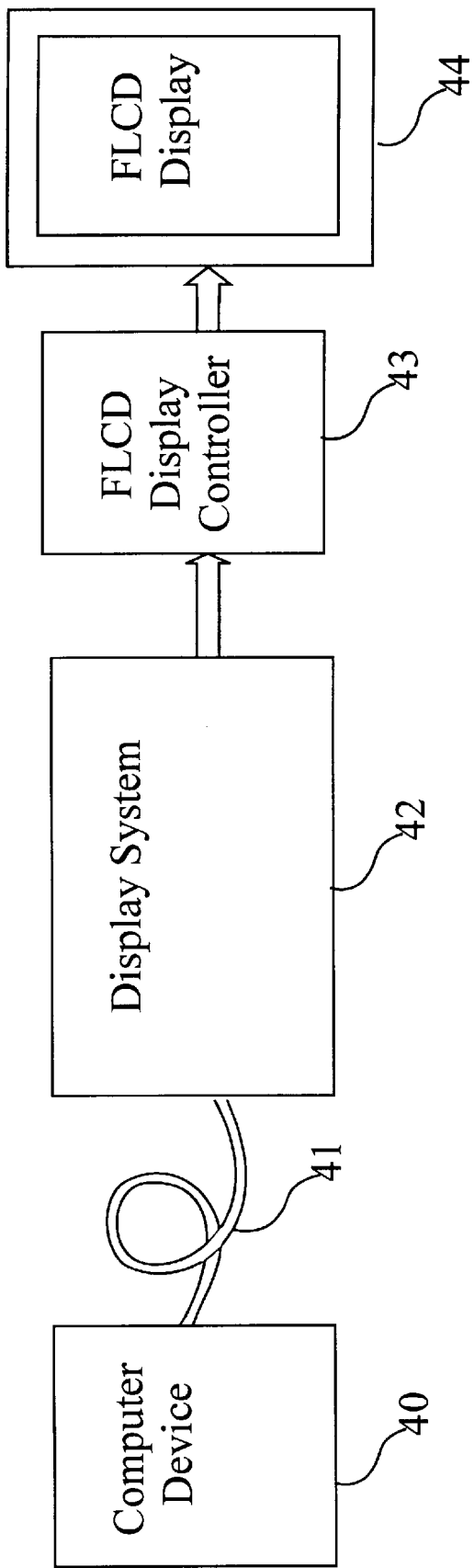
FIG. 13 is a schematic view of a colour display system for use with the preferred embodiment.

In FIG. 13 there is shown the colour display system that utilizes the above apparatus and methods. The display system includes a simplified discrete level display in the form of a bi-level Ferro-Electric Liquid Crystal (FLCD) Display 44, and its controller 43 and a computer device 40 which produces output in an analogue format as mentioned previously, and this information is sent to the display 44 along a cable 41. Interposed between the computer device 40 and the FLCD display 44 is a display system 42 for conversion of the analogue output from computer device 40 into a form suitable for display on the bi-level FLCD display 44. For the purposes of use with the preferred embodiment it can be assumed that display system 42 includes an analogue to digital converter for each input channel in cable 41, whereby the input in an analogue format is converted to a corresponding digital format for processing by the display system 42.

Figure 14:
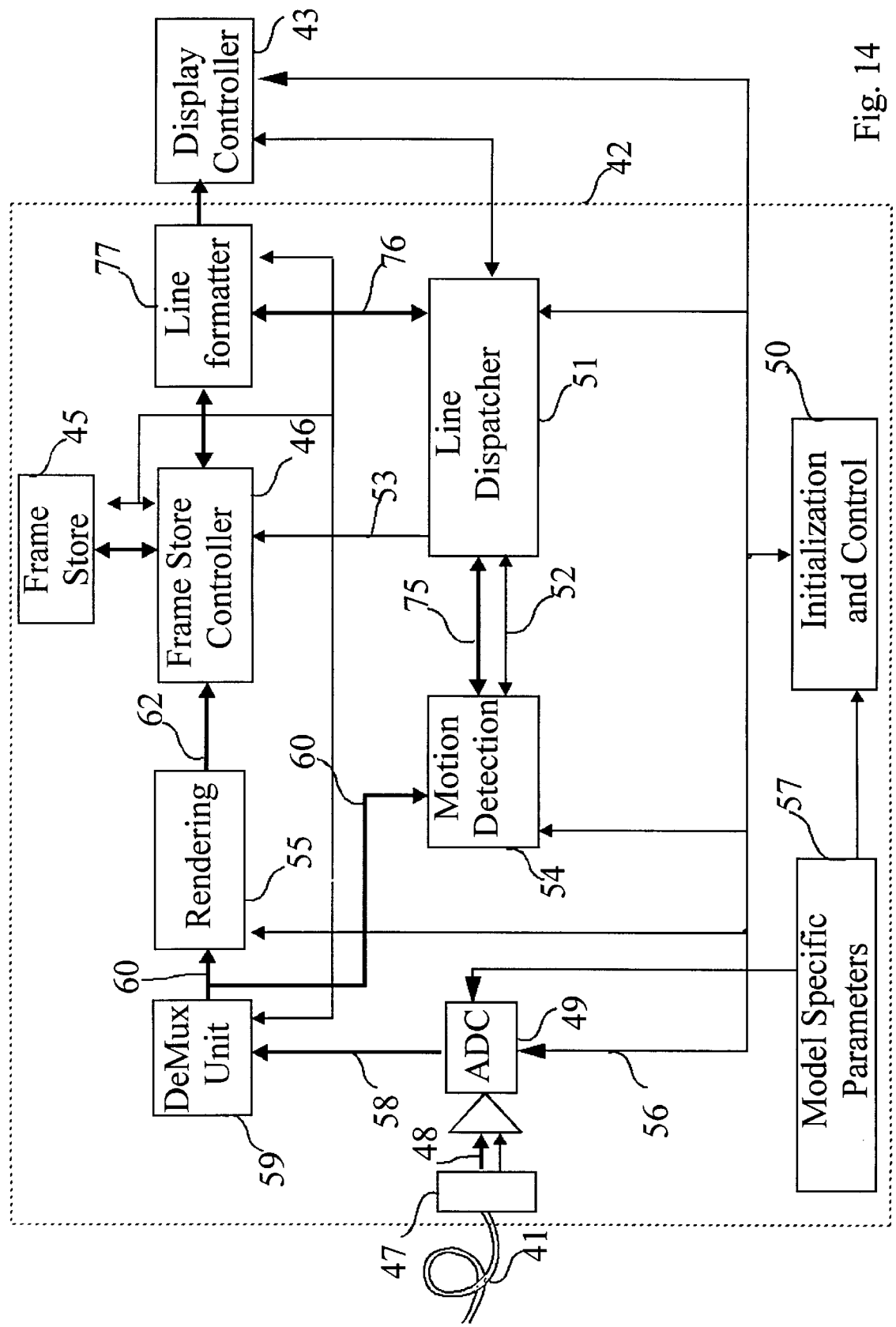
FIG. 14 is a schematic view of the different parts of a colour display system of FIG. 13.

Referring now to FIG. 14, there is shown the display system 42 of the above mentioned application in more detail. The display system 42 includes an analogue to digital conversion unit 49 which converts analogue input into an 8 bit digital representation of pixel values in addition to pixel clocking and associated control in formation. A demultiplexer 59 groups together pixels, two at a time, so as to reduce processing speed requirements, and forwards them to a rendering unit 55.

Figure 15:
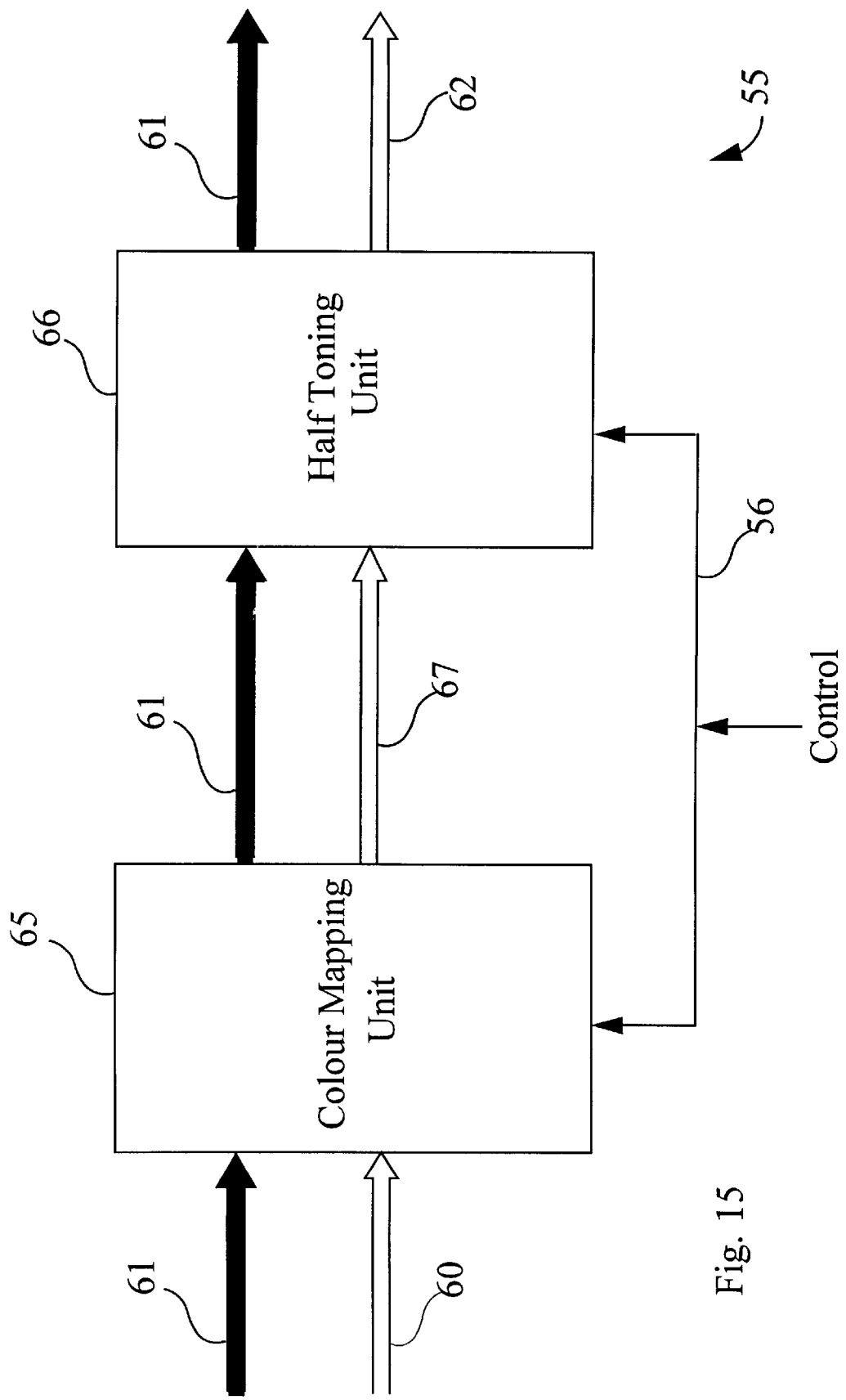
FIG. 15 is a schematic view of the rendering unit of the colour display system of FIG. 14.

Turning now to FIG. 15, the rendering unit 55 consists of a colour mapping unit 65 and a halftoning unit 66. A demultiplexer output bus 60 connects to the colour mapping unit 26 to supply RGB pixel information. Synchronization information comprising the pixel clock, vertical sync and horizontal sync signals, are supplied with the pixel input. The colour mapping unit 65 performs a series of transforms on the input RGB pixel data before sending the transformed pixels to the halftoning unit 66, via a colour mapping to halftoning pixel bus 67, to halftone the pixels to produce 4-bit pixel output. This output appears on rendering unit output bus 62.

Figure 16:
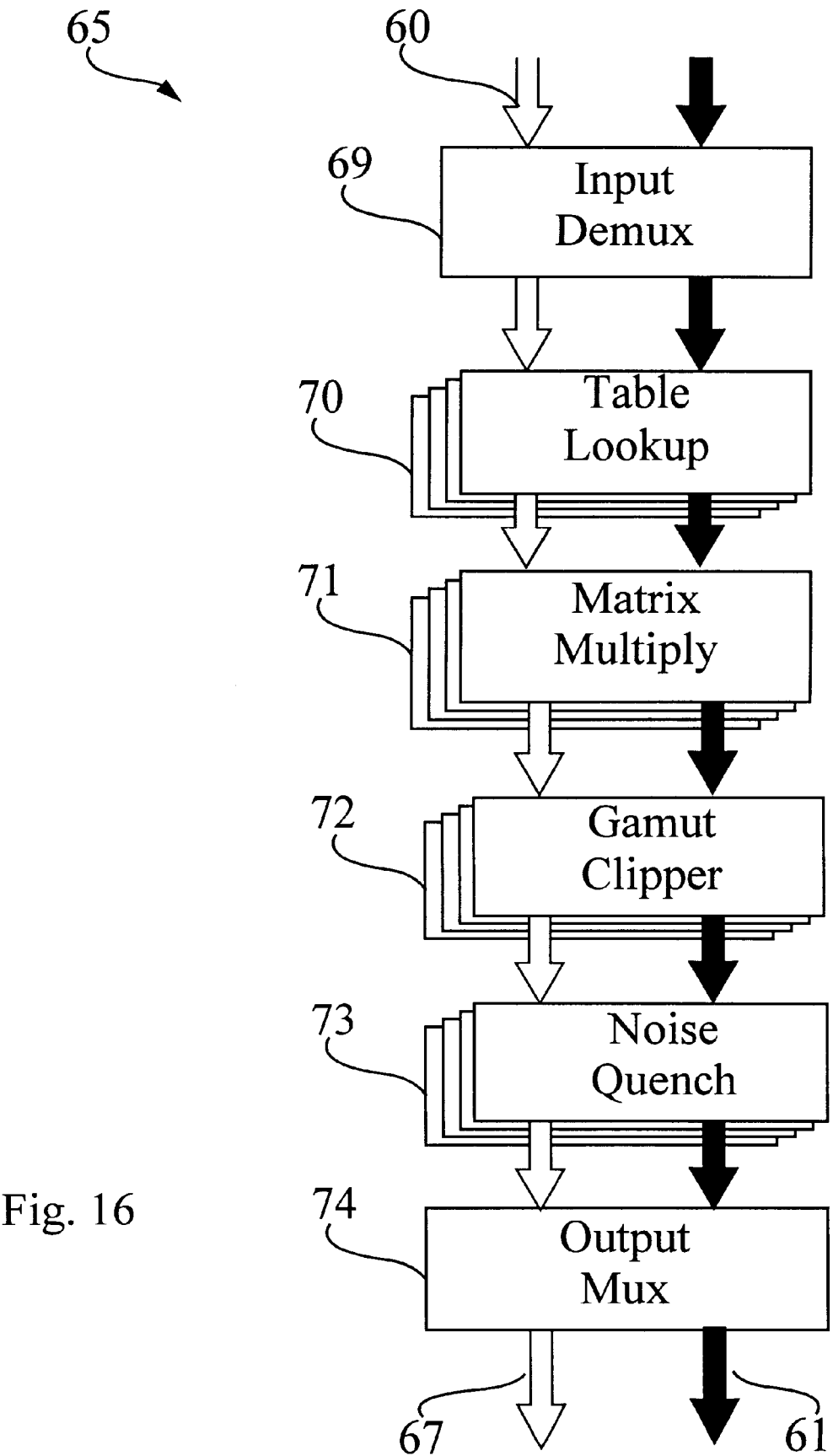
FIG. 16 is a schematic view of the colour mapping unit of FIG. 15.

Referring now to FIG. 16, there is shown in more detail a first embodiment of the colour mapping unit 65. The colour mapping unit 65 performs a series of transformations on RGB digital video data, mapping each pixel of the input data to a new position in RGB space. The purpose of these transformations is to modify video data intended for display on a CRT so that it is suitable for display within the gamut of the FLCD display 5.

The colour mapping unit 65 has a pipelined structure, with identical input and output interfaces. Each of the colour transformations can be switched in or out by appropriate configuration.

The colour mapping unit 65 performs a series of transformations on the input RGB data prior to halftoning. These transformations are applied one after the other, re-mapping data within the RGB space to achieve the following effects:

1. Gamma Correction (also called DeGamma)
2. Contrast Enhancement
3. Colour Masking
4. Gamut Clipping
5. Noise Quench The pixel input data is taken from demultiplexer output bus 60, two pixels at a time. The pixel input data is further demultiplexed by colour mapping demultiplexer 69 so that the rest of the colour mapping unit 65 works in parallel on four pixels at a time.

A colour mapping table lookup unit 70 implements the processes of gamma correction and contrast enhancement by replacing each pixel by a predetermined value stored in a lookup table whose values can be written through a configuration interface at system start-up.

Gamma correction is a monotonic, non-linear transformation applied to the Red, Green and Blue components of a pixel independently. Its purpose is to correct the intensity of the incoming colour components, which are originally intended for display on a CRT, to match a FLCD panel's characteristics. Given that the primary colour component values of each pixel is in the range of 0 to 255, the following formulae must be applied to each of the input colour components:

$$R_{out}=255*(R_{in}/255)^{\gamma}$$

$$G_{out}=255*(G_{in}/255)^{\gamma}$$

$$B_{out}=255*(B_{in}/255)^{\gamma}$$

The value of $\gamma$ is a measurement of the colour response characteristics of a given panel and is determined by measurement. The colour mapping unit 65 can implement this degamma function using a lookup table.

Contrast Enhancement is a linear transformation, also applied to Red, Green and Blue components independently. Contrast enhancements moves all colours towards the corners of the input gamut, increasing the contrast between near-black and near-white areas. Preferably contrast enhancement is implemented by changing the values loaded into the lookup table of colour mapping table lookup unit 70 as this avoids the colour mapping unit 65 having any hardware dedicated specifically to contrast enhancement.

Contrast enhancement applies a linear multiplication factor to each of the R, G and B values of each sample, according to the formula:

$$R_{out}=((R_{in}-128)*(256/h))+128$$

$$G_{out}=((G_{in}-128)*(256/h))+128$$

$$B_{out}=((B_{in}-128)*(256/h))+128$$

where h is an integer in the range 1 to 256.

Figure 17:
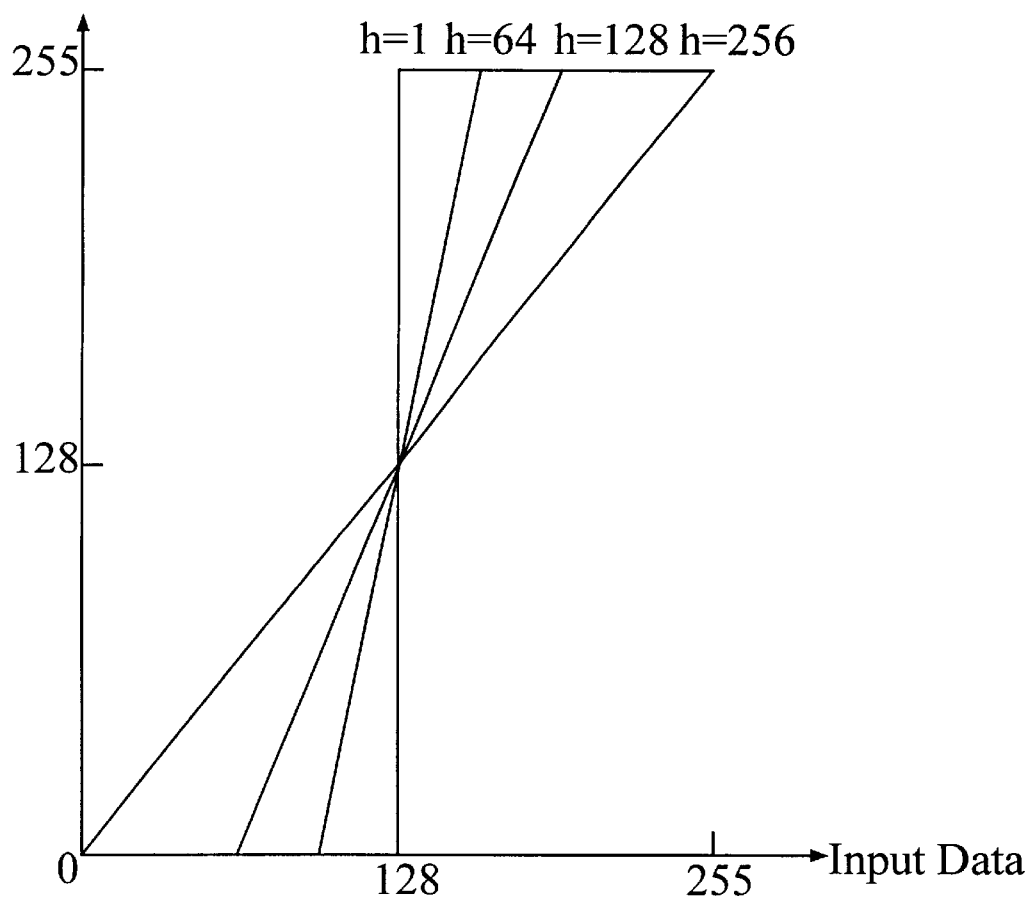
FIG. 17 illustrates the contrast enhancement process.

FIG. 17 shows the corresponding effect of contrast enhancement on input pixels for different values of h being one of 1, 64, 128, 256.

As seen in FIG. 16, a colour mapping matrix multiply unit 71 implements Colour Masking by applying a programmable matrix multiplication to the incoming RGB data. Colour Masking is a matrix transformation of the input data where each output (Red, Green and Blue) depends on each of the Red, Green and Blue inputs. It is designed to compensate for any non-orthogonal colour characteristics of the FLCD display 44. A possible additional function of the colour mask circuit is to perform RGB to luminance conversions employing the Green matrix multiply circuit only.

The colour mapping matrix multiply unit 71 includes nine programmable registers which hold matrix coefficients $a_{rr}$ through to $a_{bb}$ which are loaded at start-up time and are determined from measurement of the colour characteristics of the FLCD display 44. The colour mapping matrix multiply unit 71 produces output colours according to the following formula.

$$R_{out}=a_{rr}R_{in}+ar_gG_{in}+ar_bB_{in}$$

$$G_{out}=a_{gr}R_{in}+ag_gG_{in}+ag_bB_{in}$$

$$B_{out}=a_{br}R_{in}+ab_gG_{in}+ab_bB_{in}$$

A gamut clipping unit 72 constituting an apparatus embodying the invention, compensates for the fact that the RGBW display of the FLCD panel cannot represent all of the possible values in the RGB space. Values that cannot be represented, which are generally near-saturated colours, are remapped to within the panel's colour gamut.

A noise quenching unit 73 attempts to compensate for rectified noise in the near-saturated regions of the input. It works by mapping near-saturated pixels to their saturated values if some number of the adjacent pixels are also saturated.

Figure 19:
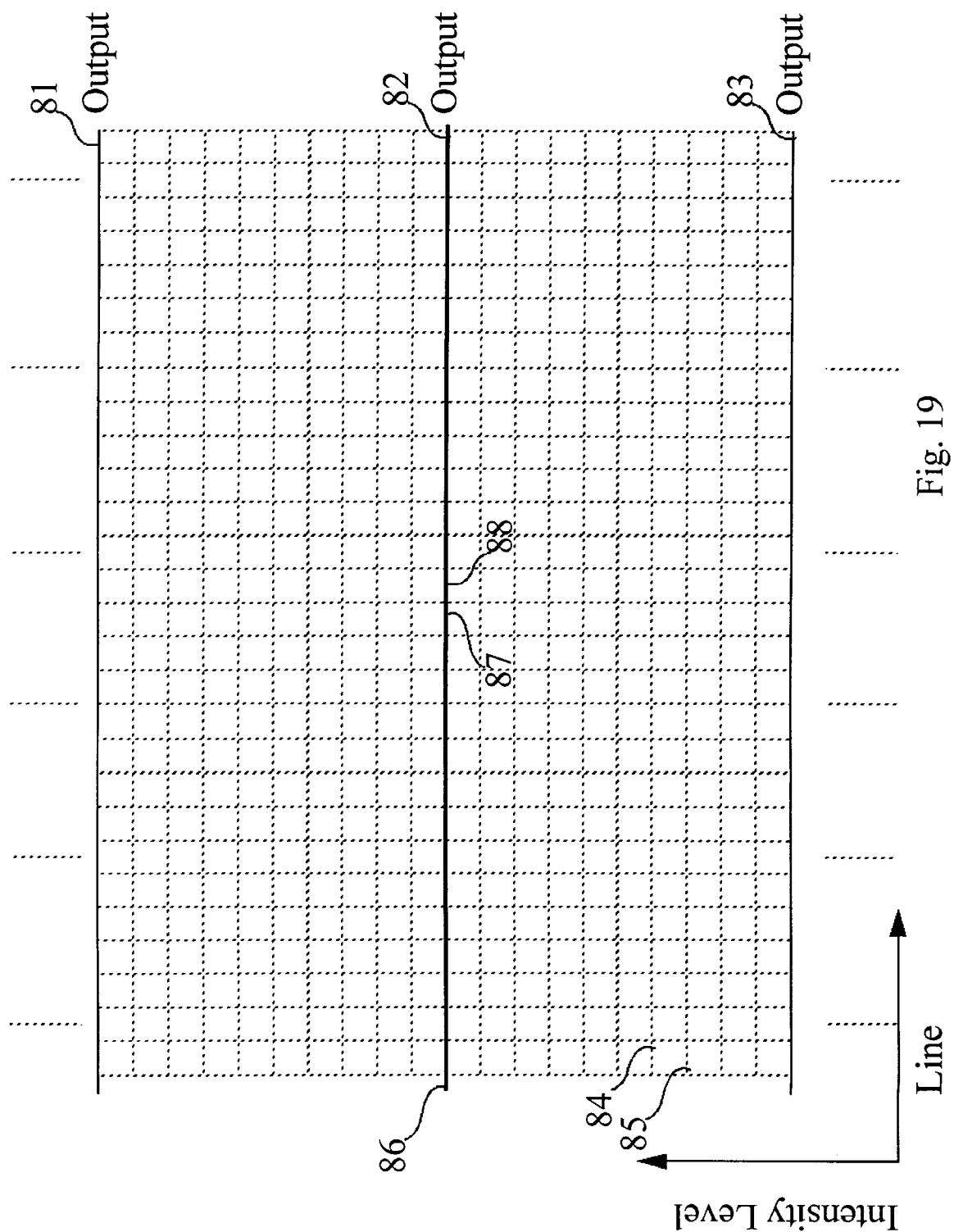
FIG. 19 is a graphical view of the pixel intensity level versus pixels on a line, for a region of constant intensity.

Turning now to FIG. 19, an example is shown of the process of error diffusion which is normally used where the number of levels of an output device is less than the number of levels assumed by the input means to that device. FIG. 19 shows the granularity of the possible output levels, 81, 82, 83 is much less then the granularity of the input levels 84, 85. In the present example, the granularity of the output is 10 times less than the granularity of the input. As a consequence, processes such as error diffusion or halftoning are used to attempt to approximate the display of the desired input image as close as possible using the limited number of output levels available. FIG. 19 shows a region of a line at a constant intensity, with portions 87, 88 representing adjacent pixels on a line.

The preferred embodiment is most-effective in regions of near constant intensity level. In FIG. 19 it is assumed that such a region exists whereby the input 86 is of near constant intensity level for the portion of a line. In this example, the input intensity level 86 happens to also coincide with an output intensity level 82. Hence the error in the possible value that the output display can use to display this value is zero.

However, when using an input which is derived from an analogue source, it is inevitable that some form of 'noise' will be associated with the input signal. It is assumed for the purposes of discussion of the preferred embodiment that the form of noise is Gaussian and random in nature. The effect of this noise is to produce fluctuations in the input signal and this in turn can cause fluctuations in the output of the analogue to digital converters that convert the analogue input to a corresponding digital output level. For the purposes of discussion of the preferred embodiment it can be assumed that each analogue to digital converter produces an 8-bit output format and hence are capable of producing one 256 different levels in the range of 0 to 255.

Figure 20:
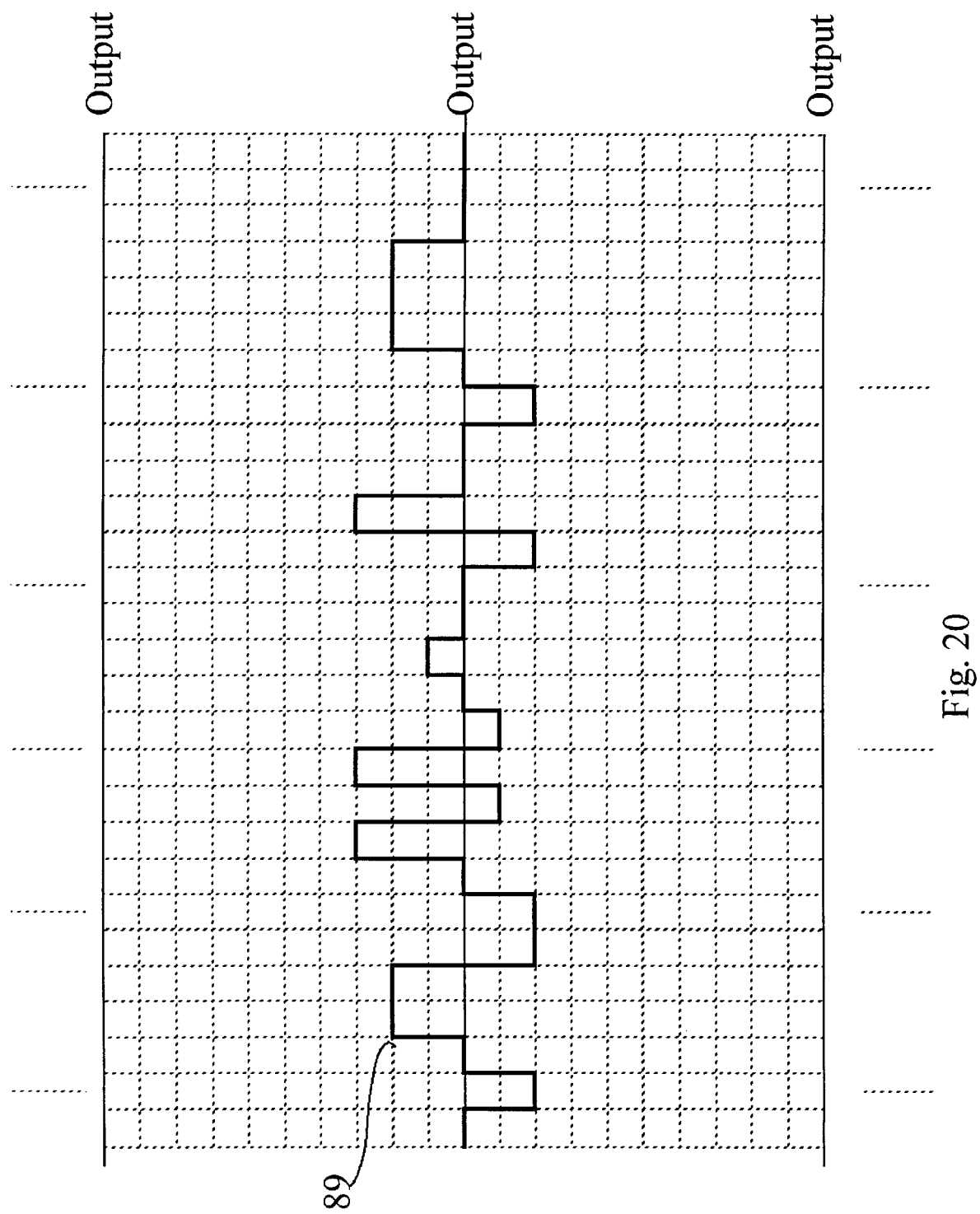
FIG. 20 is a graphical view of the pixel intensity level in FIG. 19 with noise added to the pixel intensity level.

Referring now to FIG. 20, there is shown a noise input signal 89 which consists of the input signal 86 of FIG. 19 with the addition of random Gaussian noise. The nature of this noise is substantially symmetric about an actual intensity value and causes the output of the analogue to digital converter to deviate from the true value of input signal 86 (FIG. 19).

If an error diffusion process such as the Floyd-Steinberg process is now used on the input signal 89, it is found that the output produced by the process is substantially unaffected by the effects of symmetrical forms of noise (provided they are not too large) as the effect of the error diffusion process is to spread the error associated with the display of a current pixel to adjacent pixels.

This has been found to have the affect of cancelling out low levels of symmetrical noise as the process acts somewhat like a low pass filter on an input signal. Hence the noise is not a significant problem.

Figure 21:
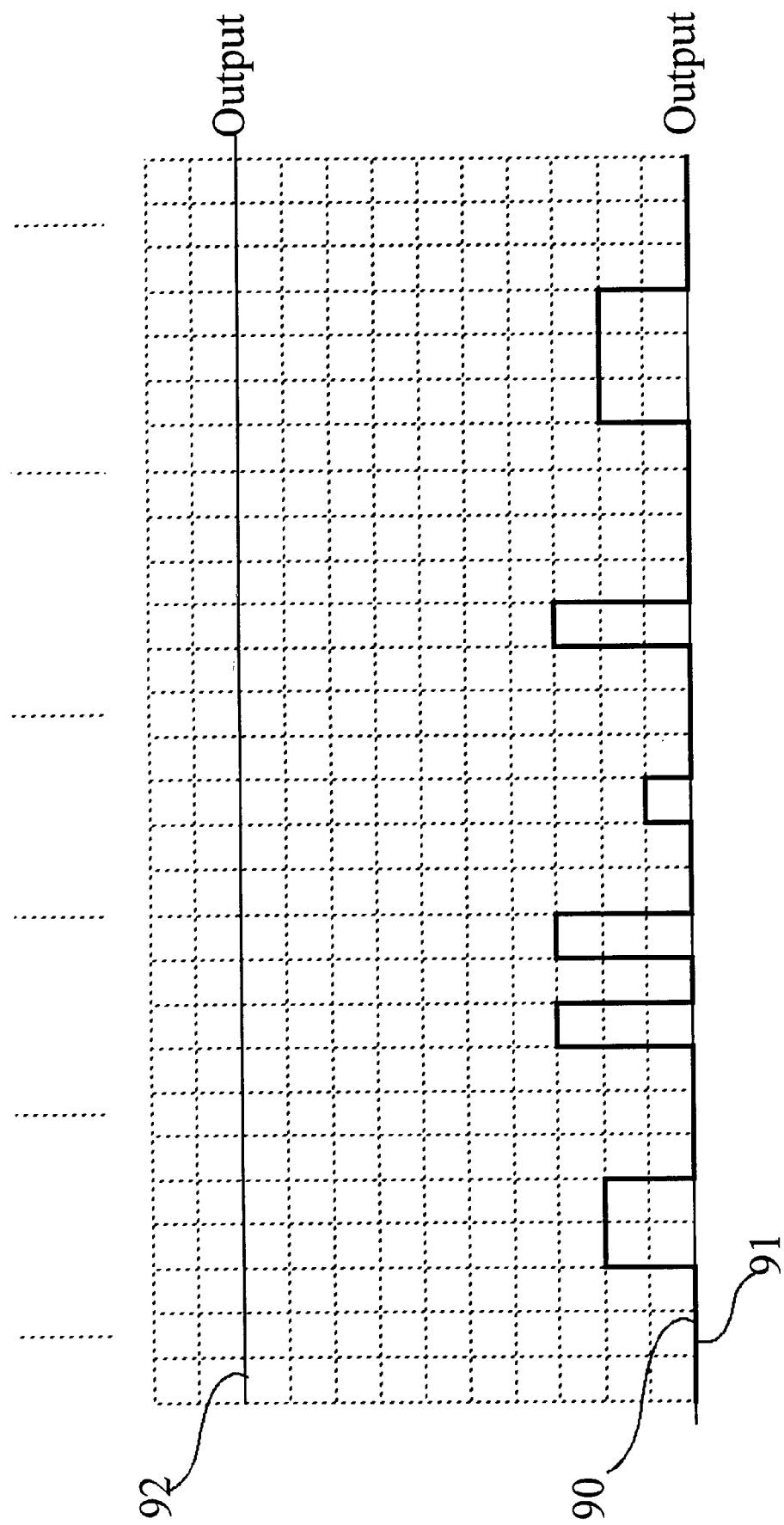
FIG. 21 is a graphical view of an input pixel intensity level of zero with noise which has been rectified.

Referring now to FIG. 21, there is shown the effect of noise near the extremity of the outputs of the analogue to digital converter. Noise at this (lower) extremity (and at the other (higher) extremity of the analogue to digital converter) can lead to problems occurring. The lowest value that the analogue to digital converter can output is set to be at a zero level, corresponding to the lowest analogue value expected from the computer device 40. Hence those values of the input signal that are below zero are rectified to zero by the analogue to digital converter and the output from the analogue to digital converter is in the form of rectified signal 91 with values less than output level signal 0 (90) being removed.

As mentioned previously, in error diffusing the rectified signal 91, the normal process of error diffusion takes the rectified signal 91 and determines which level is the closest level to the rectified signal 91 level (in this case output level signal 0 (90)) and takes the difference between these two levels and distributes it to adjacent pixels according to the particular error diffusion schema, with Floyd-Steinberg coefficients being the preferred schema. However, as the input is now in a rectified form and all the resultant differences are also in a positive form, it has been found that by diffusing these positive errors to adjacent pixels, the value of adjacent pixels (which includes that pixels actual value as well as the summation of error values from its adjacent pixels) can be built up to such a point that the output level 1 (92) becomes the closest pixel and consequently output level 1 (92) will be displayed on the output display device 44.

This has been found to give an unsightly distraction on the output display. Particularly in large areas of constant intensity of one colour as, when displaying the consequential error diffused representation of this area it is found that the area is 'sprinkled' with pixels of a different colour. This has been found to be particularly distracting and noticeable to an observer of the display. The problem does not appear to be as prominent in displaying areas of constant illuminated colour where the output level is other than at the extremity as the noise in the input signal will not be rectified by the analogue to digital converters and the error differences will be more likely to be smoothed out by adjacent pixels.

The preferred embodiment is directed to a noise quench method designed to remove rectified noise in colours in which one component is saturated or near the extremity of an analogue to digital conversion device. Although the preferred embodiment will be described in relation to a single primary colour, by using the method described in the preferred embodiment on each primary colour, the method can be applied to a display having multiple primary colours.

In the preferred embodiment, an attempt is made to determine if an input signal at the extremity of the analogue to digital converter is in essence only noise and hence the noise can be removed from the input signal before the input signal is used for halftoning.

For each pixel value that is less than a predetermined distance from zero, the three horizontally adjacent pixels on each side are examined. If two or more of these pixels are exactly zero, then the original pixel is assumed to really also represent a zero value and its value is set to zero. Similarly if a pixel's value is near 255(the saturation level), and two adjacent pixels of the three horizontally adjacent pixels on each side are exactly 255, then the pixel is set to 255. The predetermined distance value for deciding to force the pixel to a saturated value can be varied for each primary colour used in the display.

For an input line having M pixels on each line and primary colour input values being red, green and blue, the preferred method can be stated as:

For i=0 to M−1:

If $R(i)<R_{LT}$, and two or more of {R(i−3),R(i−2), R(i−1), R(i+1),R(i+2),R(i+3)} are equal to 0, then $R_{out}(i)=0$;

If $R(i)>R_{UT}$, and two or more of {R(i−3),R(i−2), R(i−1), R(i+1),R(i+2),R(i+3)} are equal to 255, then $R_{out}(i)=255$;

Otherwise, $R_{out}(i)=R(i)$.

If $G(i)<G_{LT}$, and two or more of {G(i−3),G(i−2),G(i−1), G(i+1), G(i+2), G(i+3)} are equal to 0, then $G_{out(i)}=0$;

If $G(i)>G_{UT}$, and two or more of {G(i−3),G(i−2),G(i−1), G(i+1), G(i+2), G(i+3)} are equal to 255, then $G_{out(i)}=255$;

Otherwise, $G_{out}(i)=G(i)$.

If $B(i)<B_{LT}$, and two or more of $\{B(i-3),B(i-2), B(i-1), B(i+1),B(i+2),B(i+3)\}$ are equal to 0, then $B_{out}(i)=0$;

If $B(i)>B_{UT}$, and two or more of $\{B(i-3),B(i-2), B(i-1), B(i+1),B(i+2),B(i+3)\}$ are equal to 255, then $B_{out}(i)= 255$;

Otherwise, $B_{out}(i)=B(i)$.

Where R(i), G(i), B(i) represent the red, green and blue values respectively for the pixel at position i of a line.

$R_{LT}$ and $R_{UT}$ are the predetermined upper and lower thresholds of the red value of a pixel.

$R_{out}(i)$, $G_{out}(i)$, $B_{out}(i)$ represent the values to be output to a halftoning arrangement for the red green and blue portions of a pixel i respectively.

Pixels at start and end of a line are treated as special cases and their values are not changed.

In order to better understand the preferred embodiment, there is provided in Appendix 1, a C-code simulation of the process of the preferred embodiment operating on an image having Red, Green and Blue components as outlined above. In this simulation, there is assumed to be provided an input colour image having a noise for each primary colour in an array 'in'. The main subroutine 'suppress_noise_image' uses another subroutine 'suppress_noise_plane()' to suppress the extremity noise of each individual primary colour separately.

Figure 22:
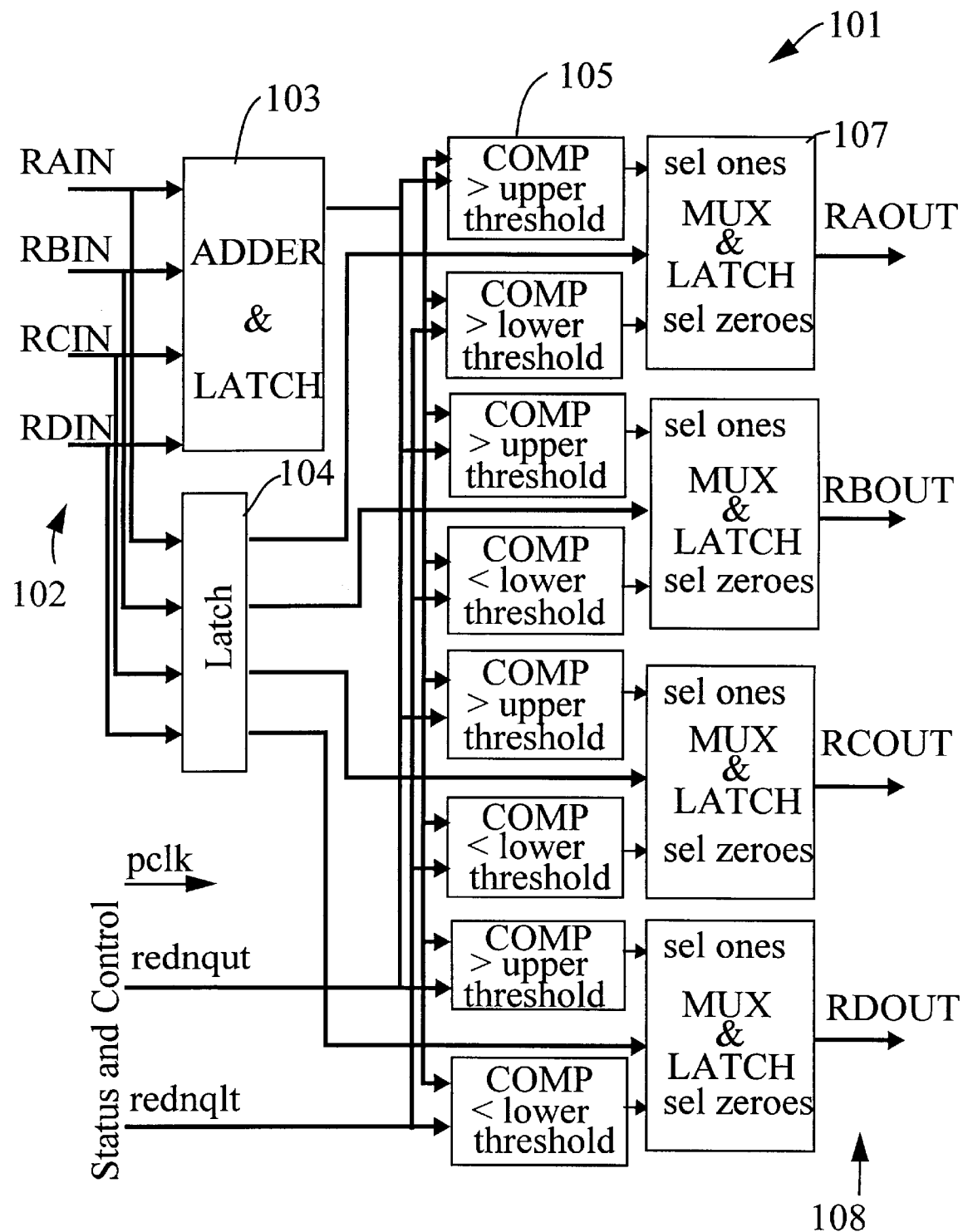
FIG. 22 is a schematic block diagram of an noise quenching apparatus for use in the preferred embodiment.

Referring now to FIG. 22, there is shown an apparatus 101 incorporating a simplified version of the methods of the preferred embodiment. For the sake of clarity, only the Red data channel is shown, with the green and blue channels being equivalent.

In the apparatus 101, data is input 102 at a rate of four pixels at a time. If the sum of the four pixels is greater than an upper threshold, then all four pixel samples are set to 255. Similarly, if the sum of four pixels is less than a lower threshold, then all four samples are set to 0. Otherwise, the pixels are passed to the output unaltered. An adder and latch 103 adds together the input values while a latch 104 stores the input values.

Once added together each pixel is compared against an upper threshold 105 and a lower threshold 106 to determine 107 whether each output pixel value 108 should be the highest possible value, the lowest possible value or the input value A colour mapping multiplexer 74, multiplexes the pixels so that the output format of the pixels is the same as that of the input to colour mapping demultiplexer 69. Referring now to FIG. 15, the pixel and control information is subsequently forwarded on colour mapping to halftoning pixel bus 67 and to colour mapping to halftoning control bus 68 to the halftoning unit 66.

Figure 18:
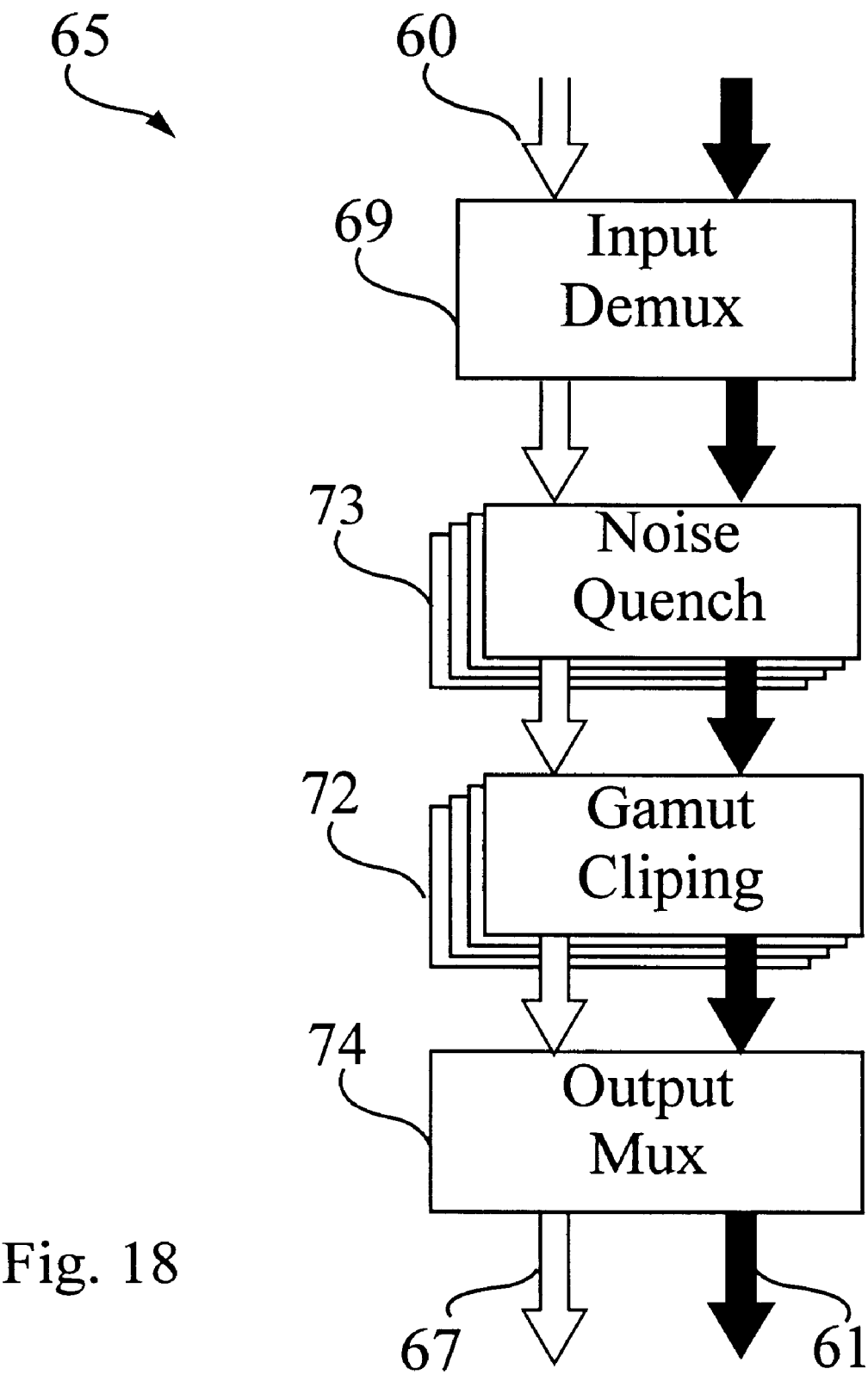
FIG. 18 is a schematic view of a second embodiment of the colour mapping unit of FIG. 15.

Referring now to FIG. 18, there is shown a second embodiment of the colour mapping unit 65 containing only the colour mapping demultiplexer 69, gamut clipping unit 72, noise quenching unit 73 and colour mapping multiplexer 74. The second embodiment has the advantage of a substantial reduction in complexity in comparison to the first embodiment with the disadvantage of a loss in versatility in being unable to perform gamma correction, contrast enhancement or colour masking.

Returning to FIG. 14 and FIG. 15, the halftoning unit 66 transforms continuous tone RGB data input on colour mapping to halftoning control bus 68, to 4-bit per pixel RGBW pixel data, suitable for display on the FLCD display 44. Output pixel data is forwarded to the frame store controller 46 for storage in the frame store 45.

It is envisaged that different gamut clipping methods can be used for different areas of the RGB cube structure, additionally a combination of methods can be employed in areas where this is found to give superior results. Appendix 1 shows a C-code simulation of the simultaneous use of two different methods, being the shortest distance method and the drop clip method.

The particular values used in the C-code simulation are dependant on the position of various pixels including the white pixel in the input RGB colour space. In the Appendix, it is assumed that the white pixel has co-ordinates R=G=B= 102 and that the value of each primary colour ranges from 0 to 255. In an actual implementation, the various pixels values can be loaded as a configuration variable.

In this simulation the drop-clip method is preferred in the used, blue-red (magenta) and red saturated corners of the RGB cube and the shortest distance method is used near the green, blue-green (cyan) and red-green (yellow) corners.

As a consequence of the description in the foregoing embodiment, it can be seen that input data presented in, for example, an RGB format can be displayed on a device having a different output format than the input format, while simultaneously attempting to use the full potential of the output display in its use of colours and their respective intensities. YMC format, Lab format, or YCrCb format can also be displayed as alternatives to the RGB format.

The foregoing description describes only some of the embodiments of the present invention, and makes a number of assumptions which can vary in practice. One of these assumptions is that the colour space of both devices is in the form of a cube. Deviations from a cubic structure can occur in practice and modifications of the present embodiment, obvious to those skilled in the art, can be made thereto without the departing from the scope of the invention.

For example, the present invention can be applied to any colour model, without significant change, as would be understood by those skilled in the art. The present invention is applicable for halftone processing where each colour component converts colour image data of 8 bits into data of multi-level below 256 levels (8 bits), instead of binarizing.

APPENDIX 1

```
/* is_corner—determine if we are in a particular corner
   of the cube */
local bool is_corner(c1,c2)
int c1,c2;
{
   return((c1-c2)>153);
}
/* clip_from_vals—determine the new value for red,
   green and blue, based upon the
present location value in the cube stored in the array
   from_vals[3]. */
void clip_from_vals(from_vals)
int from_vals[3];
{
int red,green,blue,diff;
bool lots_of_red_little_green_corner, lots_of_green_
   little_red_corner, lots_of red_little_blue_corner,
   lots_of_blue _little_red_corner, lots_of green_
   little_blue_corner, lots_of blue_little _green_
   corner;
red=from_vals[RED];
green=from_vals[GREEN];
blue=from_vals[BLUE];
/* determine which possible corners of the present loca-
   tion are valid */
```

```
lots_of red_little green corner=is_corner(red,green);
lots_of green_little_red_corner=is_corner(green,red);
lots_of red_little_blue_corner=is_corner(red,blue);
lots_of blue_little_red_corner=is_corner(blue,red);
lots_of green_little_blue_corner=is_corner(green,
    blue);
lots_of blue little green corner=is_corner(blue,green);
if(lots_of blue_little_red_corner)
    {
    if(lots_of_blue_little green_corner)
        { /* perform a drop clip */
        if(red<green)
            {
            blue-=(blue—red—153);
            }
        else /* red>=green */
            {
            blue-=(blue-green-153);
            }
        }
    else if(lots_of_green_little_red_corner)
        { /* At the corner, move to nearest plane and then
            drop clip */
            diff=green-red_153;
            green-=diff/2;
            red+=diff/2;
            blue-=(blue-red-153);
        }
    else
        { /* drop clip on blue */
        blue-=(blue-red-153);
        }
    }
else if(lots_of blue_little_green_corner)
/* & not(lots_of blue_little_red_corner) */
    {
    if(lots_of red_little green corner)
        { /* drop clip on red and blue */
        blue-=(blue-green-153);
        red-=(red-green-153);
        }
    else
        { /* drop-clip on blue */
        blue-=(blue-green-153);
        }
    }
else if (lots_of_red_little_green_corner)
/* & not(lots_of_blue_little_green_corner) */
    {
    if(lots_of_red_little_blue_corner)
        {
        if(blue<green)
            { /* drop-clip on red */
            red-=(red-blue-153);
            }
        else /* blue>=green */
            { /* drop-clip on red */
            red-=(red-green-153);
            }
        }
    else
        { /* drop-clip on red */
        red-=(red-green-153);
        }
    }
else if(lots_of red_little_blue_corner)
    /* & not(lots_of_red_little_green_corner)
    */
    {
    if(lots_of_green_little_blue_corner)
        { /* find shortest distance to plane intersection
            and then drop-clip on red */
        diff=green_blue_153;
        green-=diff/2;
        blue+=diff/2;
        red-=(red-blue-153);
        }
    else
        { /* drop on red */
        red-=(red-blue-153);
        }
    }
else if(lots_of_green_little_blue_corner)
    /* & not(lots_of_red_little_blue_corner) */
    {
    if(lots_of_green_little_red_corner)
        {
        if(red<blue)
            { /* find shortest distance to plane intersection
                and then drop-clip on blue */
            diff=green-red-153;
            green-=diff/2;
            red+=diff/2;
            blue=green-153;
            }
        else /* red>=blue */
            { /* find shortest distance to plane intersection
                and then drop-clip on red */
            diff=green-blue-153;
            green-=diff/2;
            blue+=diff/2;
            red=green-153;
            }
        }
    else
        { /* find shortest distance. */
        diff=green-blue-153;
        green+=diff/2;
        blue+=diff/2;
        }
    }
else if(lots_of_green_little_red_corner)
    /* & not(lots_of_green_little_blue_corner)
    &
    not(lots_of_blue_little_red_corner) */
    { /* find shortest distance */
    diff=green-red-153;
    green-=diff/2;
    red+=diff/2;
    }
}
```

We claim:

1. A method for displaying a colour image on a display device which displays the colour image using red, green, blue and white output colour components, said colour image being provided as image data comprising red, green and blue input colour components, said method comprising the steps of:

mapping said image data able to be displayed by said display device into a corresponding colour point in a vector space of the red, green and blue components;

displaying, by the display device, a colour image using said red, green, blue and white output colour components, wherein the output colour components are represented as additive linear combinations of the input colour components, the display device having a gamut of output colours which is able to be represented as an object having one or more concave surfaces in the vector space;

moving any of said colour points of the image outside a convex hull enclosing the object to corresponding points inside or on a surface of said convex hull;

maintaining any of said colour points inside the convex hull and outside said object, at substantially constant positions within said convex hull without moving; and halftoning those colors corresponding to said moved points and said maintained points of the image to produce an image that can be displayed on the display device.

2. A method as claimed in claim 1, wherein the input colour components are in a format of separate colour channels for red, green and blue colours respectively.

3. A method as claimed in claim 2, wherein the moving step further includes maintaining the relative components of the red, green and blue components respectively.

4. A method as claimed in claim 2, wherein the moving step further comprises changing only one of the colour channels while maintaining the others substantially constant.

5. A method as claimed in claim 2, wherein the moving step further comprises a combination of at least two of the following;

moving the input colour points by the shortest vector distance to a position within said volume;

maintaining the relative components of the red, green and blue components respectively;

changing only one of the colour channels while maintaining the others substantially constant.

6. A method as claimed in claim 1, wherein the output colour components are in the form of separate colour information for red, green, blue and white colour information respectively.

7. A method as claimed in claim 6, wherein the white colour is limited to two levels.

8. A method as claimed in claim 1, wherein the moving step further comprises moving the input colour points by the shortest vector distance to a position within, or on the surface of, said volume.

9. An apparatus for displaying a colour image on a display device which displays the colour image using red, green, blue and white output colour components, said colour image being provided as image data comprising red, green and blue input colour components, the display device being configured to display a colour image by using red, green, blue and white output colour components, said apparatus comprising a plurality of channel processing means, said channel processing means comprising:

undisplayable colour determination means adapted for determining those undisplayable colours outside a convex hull enclosing a displayable gamut of the display device and for determining those colours inside said convex but outside said displayable gamut;

remapping means connected to said undisplayable colour determination means and configured to alter only said undisplayable colours to be inside or on a surface of the convex hull of the displayable gamut, wherein said remapped undisplayable colours are represented as an additive linear combination of colours inside and/or on a surface of said convex hull; and error diffusing means for halftoning said remapped undisplayable colours and said colours inside said convex hull but outside said displayable gamut.

10. An apparatus as claimed in claim 9, wherein said input colour format comprises multiple colour channel values, and said remapping means alters said undisplayable colours by altering one of said colour channel values.

11. An apparatus as claimed in claim 10, wherein said input colour format comprises a first colour channel value and a plurality of ancillary colour channel values, and said undisplayable colour determination means includes:

minimization determination means adapted to determine the minimum value of said ancillary colour channel values, addition means adapted to add a predetermined gamut limit threshold value to said minimum value to produce an intermediate gamut extent value, and comparison means adapted to determine if said intermediate gamut extent value is less than said first colour channel value and thereby determine that a corresponding colour is a said undisplayable colour, wherein said remapping means is connected to said comparison means and alters said undisplayable colour when said comparison means determines that the value of said first colour channel corresponds to a non-displayable colour.

12. An apparatus as claimed in claim 11, wherein alteration by said remapping means replaces said first colour channel value by said intermediate gamut extent value.

13. Image processing method for a colour output device which displays a colour image by using red, green, blue and white components, using additive colour components, said method comprising the steps of:

inputting a colour image signal provided as image data comprising red, green and blue components;

defining a restricted colour space to be a convex hull enclosing a set of displayable colours of the colour output device;

mapping those portions of said input colour image signal outside said restricted colour space to corresponding non-moving signal positions inside said restricted colour space, wherein the mapped portions are represented as an additive linear combination of corresponding non-moving signal positions on and/or inside said convex hull, wherein those portions of said input color image signal inside said restricted color space but not including said set of displayable colours are maintained at substantially constant positions; and processing the mapped colour image signal and those portions of said input color image signal inside said restricted colour space but not including said set of displayable colours, by using an error diffusion method.

14. A method as claimed in claim 13, wherein said colour image signal comprises multi-value data for each colour component and said processing is halftoning.

15. A method as claimed in claim 13, wherein said mapping includes moving any of the input colour images outside the restricted colour space to corresponding points inside or on a surface of the restricted colour space.

16. A method as claimed in claim 13, wherein the colour output device is a colour display device.

17. A method as claimed in claim 16, wherein the colour display device is a FLCD display device.

18. A method as claimed in claim 13, wherein the colour output device is a colour printer.

19. A colour image processing method comprising the steps of:

inputting colour image points provided as image data comprising red, green and blue components;

mapping those inputted colour image points outside a colour gamut of an output device which displays a colour image by using red, green, blue and white components to within or on the surface of a convex hull enclosing the colour gamut of the output device, while maintaining the proportions of the primary colours of each mapped colour image point, wherein said mapped color image points are represented as an additive linear combination of colours within and/or on the surface of said convex hull;

maintaining those inputted color image points outside said colour gamut and inside said convex hull at substantially constant positions within said convex hull without moving; and quantizing the mapped colour image points and the colour image points outside said colour gamut and inside said convex hull, in order to output quantized data to the output device.

20. A method as claimed in claim 19, further comprising a displaying step based on the quantized colour image data.

21. A method as claimed in claim 20, wherein the displaying step utilizes a ferro-electric liquid crystal display.

22. A method as claimed in claim 19, wherein the output colours are in the form of separate colour information for red, green, blue and white colour information respectively.

23. A method as claimed in claim 22, wherein the white colour is limited to two levels.

24. A method as claimed in claim 19, wherein the inputted colour image data consists of a plurality of components.

25. A method as claimed in claim 24, wherein the mapping step further comprises changing a predetermined component while maintaining the others substantially constant.

26. A method as claimed in claim 19, wherein the mapping step further comprises mapping the inputted colour image data positioned outside of a possible range of reproduceable output colours, within the possible range, while maintaining the inputted colour image data positioned inside the possible range substantially constant.

27. A method as claimed in claim 19, wherein the quantization is a binarizing process.

28. A method as claimed in claim 19, wherein the quantization is an error diffusion method.

29. A method as claimed in claim 19, wherein only colour image data inputted outside the colour gamut is mapped to locations inside the colour gamut, and colour image data input inside the colour gamut is maintained inside the colour gamut.

30. A colour image processing apparatus comprising:

input means for inputting colour image points provided as image data comprising red, green and blue components;

mapping means for mapping those inputted colour image points outside a colour gamut of an output device which displays a colour image by using red, green, blue and white components to within or on the surface of a convex hull enclosing the colour gamut of the output device, while maintaining the proportions of the primary colours of each mapped colour image point, wherein said mapped colour image points are represented as an additive linear combination of colours within and/or on the surface of said convex hull;

maintaining means for maintaining those inputted colour image points outside said color gamut and inside said convex hull at substantially constant positions within said convex hull without moving; and quantization means for quantizing the mapped colour image points and the colour image points outside said colour gamut and inside said convex hull, in order to output quantized data to the output device, wherein said output device displays colour images using additive colour components.

31. An apparatus as claimed in claim 30, further comprising display means for displaying based on the quantized colour image data.

32. An apparatus as claimed in claim 31, wherein said display means is a ferro-electric liquid.

33. An apparatus as claimed in claim 30, wherein said quantization means is a binarization means for binarizing the mapped colour image data.

34. An apparatus as claimed in claim 30, wherein said quantization means uses an error diffusion method on the mapped colour image data.

35. An apparatus as claimed in claim 30, wherein said mapping means maps only colour image data inputted outside the colour gamut to locations inside the colour gamut, and colour image data input inside the colour gamut is maintained inside the colour gamut.

36. An image processing method for a colour display device which displays an image according to red, green, blue, and white colour signals in an additive manner, said method comprising the steps of:

inputting a colour image signal comprising red, green, and blue colour signals;

defining a restricted colour space to be a convex hull enclosing a set of displayable colours of the colour display device which displays an image according to red, green, blue, and white colour signals, in a colour space being provided by red, green, and blue colour components;

mapping portions of said input colour image signal outside said restricted colour space within said restricted color space, wherein output colours are represented as an additive linear combination of said red, green and blue input colours, wherein those portions of said input colour image signal inside said restricted colour space but not including said set of displayable colours are maintained at substantially constant positions; and processing the mapped input colour image signal and those portions of said input colour image signal inside said restricted colour space but not including said set of displayable colours, by using an error diffusion method.

37. A method for displaying a color image on a display device which displays the color image using red, green, blue and white output colour components, the color image being provided as pixels comprising red, green and blue color components from an additive color scheme, said method comprising the steps of:

mapping each said pixel able to be displayed by said display device into a corresponding color point in a vector space of the additive color scheme;

displaying, by the display device, a color image using said red, green, blue and white color components of an additive color scheme, wherein the four color components are represented as additive linear combinations of the three color components, the display device having a gamut of output colors which is able to be represented as an object having one or more concave surfaces in the vector space;

moving any of the color points of the image outside a convex hull enclosing the object to corresponding points inside or on a surface of the convex hull;

maintaining any of said colour points of the image inside the convex hull and outside said object at substantially constant positions within said convex hull without moving; and halftoning those colors corresponding to the moved points and said maintained points of the image to produce an image that can be displayed on the device.

* * * * *

UNITED STATES PATENT AND TRADEMARK OFFICE
CERTIFICATE OF CORRECTION

PATENT NO. : 6,384,836 B1
DATED : May 7, 2002
INVENTOR(S) : William C. Naylor, Jr. et al It is certified that error appears in the above-identified patent and that said Letters Patent is hereby corrected as shown below:

Column 2,
Line 3, "primary," should read -- primary colour, --.

Column 14,
Line 41, "green+=diff/2;" should read -- green-=diff/2; --.

Signed and Sealed this

Twenty-second Day of October, 2002

*Attest:*

*Attesting Officer*

JAMES E. ROGAN
*Director of the United States Patent and Trademark Office*